(12) United States Patent
Aramaki et al.

(10) Patent No.: US 6,890,984 B2
(45) Date of Patent: May 10, 2005

(54) POLYAMIDE RESIN COMPOSITION

(75) Inventors: Masaaki Aramaki, Miyazaki (JP);
Katsushi Watanabe, Miyazaki (JP);
Ikutoshi Nakashima, Miyazaki (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 186 days.

(21) Appl. No.: 09/958,982

(22) PCT Filed: Feb. 15, 2001

(86) PCT No.: PCT/JP01/01067

§ 371 (c)(1),
(2), (4) Date: Oct. 16, 2001

(87) PCT Pub. No.: WO01/60918

PCT Pub. Date: Aug. 23, 2001

(65) Prior Publication Data

US 2003/0045621 A1 Mar. 6, 2003

(30) Foreign Application Priority Data

Feb. 16, 2000 (JP) .................................... P2000-037533
Feb. 16, 2000 (JP) .................................... P2000-037534
Feb. 18, 2000 (JP) .................................... P2000-041533

(51) Int. Cl.$^7$ ................................................ C08K 3/32
(52) U.S. Cl. ...................... 524/425; 524/318; 524/322; 524/323; 524/381; 524/415; 524/425
(58) Field of Search ................................ 524/322, 323, 524/381, 425, 450, 415, 318

(56) References Cited

U.S. PATENT DOCUMENTS

| 4,857,575 A | 8/1989 | van der Meer et al. |
|---|---|---|
| 4,895,994 A | 1/1990 | Cheng et al. ............... 585/270 |
| 5,084,051 A | 1/1992 | Tormala et al. |
| 5,092,890 A | 3/1992 | Pohlemann et al. |
| 5,869,653 A | 2/1999 | Johnson ..................... 540/531 |
| 6,121,188 A | 9/2000 | Breitscheidel et al. ...... 502/301 |

FOREIGN PATENT DOCUMENTS

| EP | 0 382 508 | 8/1990 |
|---|---|---|
| EP | 0 842 699 | 5/1998 |
| EP | 1 036 819 A1 | 9/2000 |
| JP | 48-80149 | 10/1973 |
| JP | A-63-132810 | 6/1988 |
| JP | 2-120359 | 5/1990 |
| JP | 3-217454 | 9/1991 |
| JP | 4-202357 | 7/1992 |
| JP | 6-32979 | 2/1994 |
| JP | 7-228768 | 8/1995 |
| JP | 10-278065 | 10/1998 |
| JP | 11-199771 | 7/1999 |
| JP | 2000-225675 | 8/2000 |

*Primary Examiner*—Edward J. Cain
(74) *Attorney, Agent, or Firm*—Birch, Stewart, Kolasch & Birch, LLP

(57) ABSTRACT

The present invention provides a polyamide resin composition suitable as industrial materials such as automobile parts, electronic or electrical parts, and industrial machine parts, and excellent in various mechanical properties such as various kinds of moldability, rigidity, and strength, and durability such as heat-resistant aging property.

Namely, the invention relates to a polyamide resin composition comprising (A) a polyamide, (B) an apatite type compound, and (C) (i) a higher fatty acid metal salt and/or (ii) a mixture of a metal halide and a copper compound, wherein the polyamide resin composition is obtainable by adding component (C) after the formation of the apatite type compound.

10 Claims, 2 Drawing Sheets

POLYAMIDE RESIN COMPOSITION

TECHNICAL FIELD

The present invention relates to a polyamide resin composition comprising a polyamide and an apatite type compound, excellent in various kinds of moldability at, for example, injection molding, film forming, blow molding, extrusion, expansion molding, and gas-assisted molding, suitable as an industrial material of automobile parts, industrial machine parts, electric/electronic parts, various gears, and for extrusion uses (tubes, rods, filaments, films, sheets, hollow molded products, etc.), the resulting molded product being also excellent in strength, rigidity, toughness and heat resistance, as well as excellent in durability such as surface appearance, weathering resistance, heat-resistant aging property. The invention also relates to a molded product thereof.

BACKGROUND ART

For the purpose of further improvement of the mechanical properties such as strength, rigidity, and heat resistance which a polyamide resin originally has, it has been a common practice to incorporate, into a polyamide resin, various fillers including, for example, inorganic fibers such as glass fibers or carbon fibers, inorganic compounds such as calcium carbonate, mica or talc, or layered compounds such as montmorillonite and swelling fluorine mica. Although being effective for improving the strength or rigidity of the resulting molded products, these methods are accompanied with the drawback that toughness which is another characteristic of the polyamide resin is markedly impaired owing to a low affinity of the polyamide with a filler. On the other hand, Japanese Patent Laid-Open No. 217454/1991 discloses a polyamide resin composition comprising 100 parts by weight of a polyamide and 5 to 300 parts by weight of apatite aiming at obtaining a material having a touch feeling close to ivory. However, this composition is improved in strength and rigidity of the resulting molded product like the compositions having other filler added thereto, but a markedly low affinity at the interface between the polyamide and apatite causes a drastic decrease in toughness, that is, decrease in tensile elongation, which makes it difficult to use it as an industrial material.

Thus, the present inventors have proposed a polyamide resin comprising a polyamide and an apatite having a high interfacial adhesiveness to the polyamide as disclosed in Japanese Patent Laid-Open No. 199771/1999. Especially, a polyamide resin obtained by a process of mixing a polyamide raw material and an apatite raw material and carrying out the polymerization of the polyamide and the synthesis of the apatite exhibits remarkably high improving effect of interfacial adhesiveness, which enables the realization of the physical properties which conventional polyamide resins cannot be achieved. That is, they have found a polyamide resin having improved rigidity and strength without impairing toughness.

However, as a result of the studies by the inventors, the rigidity and strength of the above polyamide resin can be improved without impairing toughness, but the moldability at, for example, injection molding, film forming, and blow molding for manufacturing various parts is not satisfactory in the application to various parts such as automobile parts, electronic/electrical parts, and industrial machine parts. Moreover, durability such as weathering resistance and heat resistant aging of the resulting molded products is also still unsatisfactory in the case that they are used as exterior parts of automobiles which are exposed to flaming sun in summer or as under-hood parts neighboring an automobile engine of a high temperature.

By the way, it is well known in the art to improve moldability by incorporating a lubricant such as a higher fatty acid metal salt into a polyamide resin. Moreover, it is also well known to improve weathering resistance or heat resistant aging property by adding a mixture of a metal halide and a copper compound.

However, upon the studies by the inventors, it was found that the simple application of these conventional technologies to the above polyamide resin comprising an polyamide and an apatite type compound does not result in a satisfactory improvement in the objective properties.

An object of the present invention is to provide a polyamide resin composition and a molded product thereof which can overcome the above-described problems, of the polyamide resin comprising an polyamide and an apatite type compound which have so far remained unsolved, in other words, a composition which is excellent in various moldability at, for example, injection molding, film forming, extrusion, and blow molding, the resulting molded product being excellent in strength, rigidity, heat resistance, and toughness, as well as durability such as surface appearance, weathering resistance, and heat-resistant aging property.

DISCLOSURE OF THE INVENTION

As a result of the extensive studies for solving the above problems of the invention, the present inventors have found that, in the case of adding various additives to a polyamide composite comprising an polyamide and an apatite type compound for the purpose of improving or imparting various properties or functions, the aimed improving effect can be first attained by adding them after the completion of the formation of the apatite type compound. In particular, in the case that the additive is a metal element-containing compound, the tendency is more remarkable. Namely, in the case of adding a higher fatty acid metal salt well-known in the art as a moldability improver, or in the case of adding a metal halide or a copper compound as a heat-resistance improver, the aimed improving effect is remarkably realized by adding them after the completion of the formation of the apatite type compound.

That is, the present invention related to:

(1) A polyamide resin composition comprising (A) a polyamide, (B) an apatite type compound, and (C) (i) a higher fatty acid metal salt and/or (ii) a mixture of a metal halide and a copper compound, wherein the polyamide resin composition is obtainable by adding component (C) after the formation of the apatite type compound;

(2) The polyamide resin composition according to the above 1, wherein the amount of (B) is from 0.05 to 200 parts by weight and the amount of (C) is from 0.01 to 20 parts by weight relative to 100 parts by weight of (A);

(3) The polyamide resin composition according to the above 2, which is obtainable by adding 0.01 to 20 parts by weight of component (C) in a step after the completion of formation of the apatite type compound in the steps of producing a polyamide composite comprising the polyamide (A) and the apatite type compound (B) by incorporating 0.05 to 200 parts by weight of an apatite type compound-forming component into 100 parts by weight of a polyamide-forming component and promoting the polymerization of the polyamide and the synthesis of the apatite type compound;

(4) The polyamide resin composition according to any one of the above 1 to 3, wherein the higher fatty acid metal salt of (C) (i) is represented by the general formula (1): $CH_3(CH_2)_nCOO(M_1)$ (wherein n is from 8 to 30 and a metal element ($M_1$) is at least one metal element selected form the elements of Groups 1, 2, and 3 of the periodic table, zinc, and aluminum);

(5) The polyamide resin composition according to any one of the above 1 to 3, wherein the metal halide of the mixture (C)(ii) is potassium iodide, the copper compound is copper acetate or copper iodide, and the molar ratio of the halogen to copper is from 2/1 to 40/1;

(6) The polyamide resin composition according to any one of the above 1 to 3, wherein 1 to 300 parts by weight of a polyphenylene ether resin is incorporated into 100 parts by weight of (A), and wherein components (B) and (C) are mainly present in component (A);

(7) The polyamide resin composition according to the above 3, wherein the apatite type compound-forming component is a phosphoric acid type metal compound having a maximum particle size of 30 μm or less;

(8) The polyamide resin composition according to the above 3, wherein the apatite type compound-forming component is a phosphoric acid type metal compound having a specific surface area of 0.1 to 100 m²/g;

(9) The polyamide resin composition according to any one of the above 1 to 3, wherein an apatite type compound having an average particle size of 0.01 to 1 μm is homogeneously dispersed in a polyamide having a weight-average molecular weight of 20,000 to 200,000;

(10) A process for producing a polyamide resin composition comprising, relative to (A) 100 parts by weight of a polyamide, (B) 0.05 to 200 parts by weight of an apatite type compound, and (C) 0.01 to 20 parts by weight of (i) a higher fatty acid metal salt and/or (ii) a mixture of a metal halide and a copper compound, wherein component (C) is added after the formation of the apatite type compound.

Figure 1:
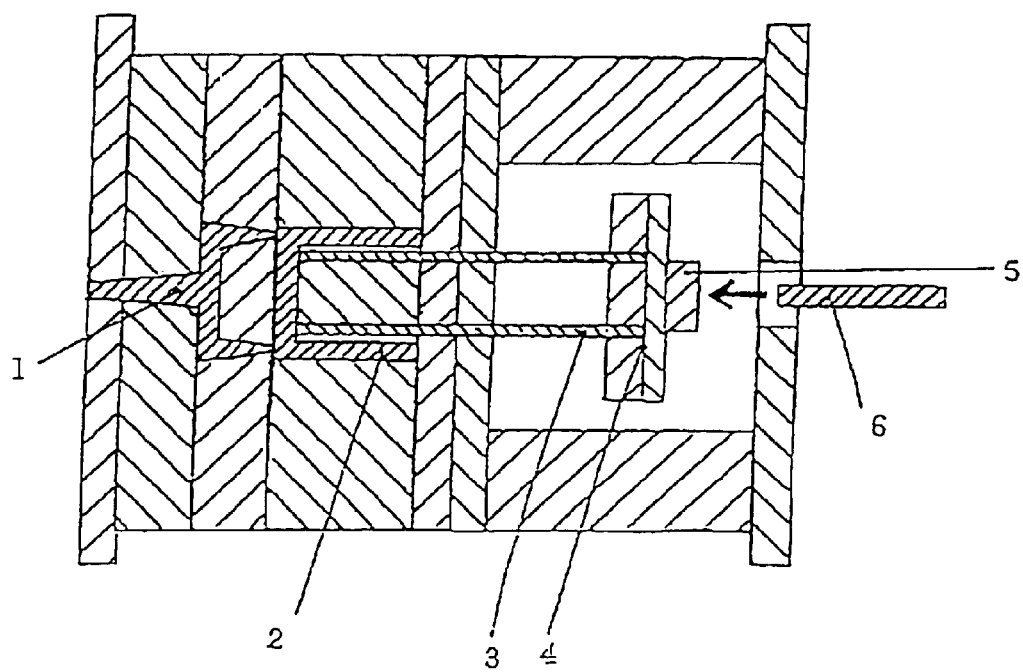
FIG. 1 is a sectional view of a mold used for evaluating releasing ability of Examples and Comparative Examples of the invention.

By the way, the symbols in the figures are as follows: 1 is sprue runner, 2 is cup shape molded product, 3 is ejector pin, 4 is ejector plate, 5 is load cell, 6 is ejector rod, 7 is weld part, 8 is sprue, 9 is runner, and 10 is molded product.

BEST MODE FOR CARRYING OUT THE INVENTION

The present invention is described in detail below.

The polyamide (A) in the invention may be any polymer having an amide linkage (-NHCO-) in the main chain.

Examples of the polyamide preferably employed in the present invention include polycaprolactam (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecalactam (nylon 11), polydodecalactam (nylon 12), polytrimethylhexamethylene terephthalamide (nylon TMHT), polyhexamethylene isophthalamide (nylon 6I), polynonanemethylene terephthalamide (9T), polyhexamethylene terephthalamide (6T), polybis(4-aminocyclohexyl) methane dodecamide (nylon PACM12), polybis(3-methyl-aminocyclohexyl)methane dodecamide (nylondimethyl PACM12), polymetaxylylene adipamide (nylon MXD6) and polyundecamethylene hexahydroterephthalamide (nylon 11T(H)) and polyamide copolymers each containing at least two different polyamides thereof, and mixtures thereof. Among these polyamides, more preferred polyamides for achieving the object of the invention are polycaprolactam (nylon 6), polyhexamethylene adipamide (nylon 66), polyhexamethylene dodecamide (nylon 612), polyhexamethylene isophthalamide (nylon 6I), polyamide copolymers each containing at least two different polyamide skeletons thereof, and mixtures thereof.

Examples of a component (raw material) for forming the above polyamides include polymerizable amino acids, polymerizable lactams, polymerizable mixtures or salts of diamines and dicarboxylic acids, and polymerizable oligomers of the above compounds.

Specific examples of the polymerizable amino acid include 6-aminocaproic acid, 11-aminoundecanoic acid, 12-aminododecanoic acid and p-aminomethylbenzoic acid. In the invention, these polymerizable amino acids may be used either singly or in combination.

Specific examples of the polymerizable lactam include butyllactam, pivalolactam, caprolactam, capryllactam, enantholactam, undecanolactam, dodecanolactam, and the like. In the invention, these polymerizable lactams may be used either singly or in combination.

Specific examples of the mixture of diamines and dicarboxylic acids or the diamine of the polymerizable salts of diamines and dicarboxylic acids include tetramethylenediamine, hexamethylenediamine, undecamethylenediamine, dodecamethylenediamine, 2-methylpentamethylenediamine, nonanemethylenediamine, 2,2,4-trimethylhexamethylenediamine, 2,4,4-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 3,8-bis(aminomethyl)tricyclodecane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl) propane, bis(aminopropyl)piperazine, aminoethylpiperazine, and the like. In the invention, these polymerizable diamines may be used either singly or in combination.

Specific examples of the dicarboxylic acid of the polymerizable salts of diamines and dicarboxylic acids include malonic acid, dimethylmalonic acid, succinic acid, glutaric acid, adipic acid, 2-methyladpic acid, trimethyladipic acid, pimelic acid, 2,2-dimethylglutaric acid, 3,3-diethylsuccinic acid, azelaic acid, sebacic acid, suberic acid, dodecanedioic acid, eicodionic acid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid, hexahydroterephthalic acid, diglycolic acid, and the like. In the invention, these polymerizable dicarboxylic acids may be used either singly or in combination. The combination of these polymerizable diamines and dicarboxylic acids may be optionally selected. Moreover, the compositional ratio of the diamine and dicarboxylic acid is preferably from 0.9/1 to 1.3/1, more preferably 0.95/1 to 1.2/1, most preferably 0.97/1 to 1.05/1, as a molar ratio of diamine/dicarboxylic acid.

The more preferred polyamide-forming component for achieving the object of the invention includes caprolactam, a mixture or salt of hexamethylenediamine and a dicarboxylic acid, a mixture or salt of hexamethylenediamine and dodecanedioic acid, a salt of hexamethylenediamine and terephthalic acid, or a mixture of at least two different polyamide-forming components selected from them.

To the polyamide-forming component (raw material) for use in the invention, it is possible to add a known terminating agent in order to control the molecular weight or improve the resistance to hot water. As the terminating agent, monocarboxylic acids and monoamines are preferred. Additional examples include acid anhydrides such as phthalic anhydride, monoisocyanates, monoacid halides, monoesters and monoalcohols.

The monocarboxylic acid usable as a terminating agent is not particularly limited insofar as it has reactivity with amino group. Examples include aliphatic monocarboxylic acids such as acetic acid, propionic acid, butyric acid, valeric acid, n-caproic acid, n-capric acid, lauric acid, tridecylic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid, and phenylacetic acid; and the like. In the present invention, these monocarboxylic acids may be used either singly or in combination.

The monoamine usable as a terminating agent is not particularly limited insofar as it has reactivity with carboxyl group. Examples include aliphatic monoamines such as methylamine, ethylamine, propylamine, butylamine, hexylamine, octylamine, decylamine, stearylamine, dimethylamine, diethylamine, dipropylamine, and dibutylamine; aliphatic monoamines such as cyclohexylamine and dicyclohexylamine and aromatic monoamines such as aniline, toluidine, diphenylamine and naphthylamine; and the like. In the invention, these monoamines may be used either singly or in combination. The adding amount of these terminating agent is preferably from 0.001 to 0.25 mol, more preferably from 0.005 to 0.20, most preferably from 0.01 to 0.17 mol.

More preferred terminating agent for achieving the object of the invention are aliphatic monocarboxylic acids such as acetic acid and stearic acid, and most preferred is acetic acid.

The molecular weight of the polyamide in the polyamide resin composition of the invention is preferably 10,000 to 1,000,000, more preferably 15,000 to 500,000, most preferably 20,000 to 200,000 as a weight-average molecular weight (Mw) from the viewpoints of excellent moldability and mechanical properties. The weight-average molecular weight can be determined from gel permeation chromatography (GPC) by using hexafluoroisopropanol (HFIP) as a solvent and polymethyl methacrylate (PMMA) as a standard sample for molecular weight.

The apatite type compound (B) preferably used in the invention is represented by the following formula:

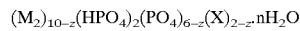

wherein $0 \leq z < 2$, $0 \leq n \leq 16$, ($M_2$) represents a metal element, and X represents an anion or an anionic compound.

Preferred examples of the metal element ($M_2$) include elements of Groups 1, 2, 3, 4, 5, 6, 7, 8, 9, 10, and 11 of the periodic table, tin, and lead. These metal elements may be used either singly or in combination. In the invention, magnesium, calcium, strontium, and barium which are elements in Group 2, and a mixture of at least two of them are particularly preferred from the viewpoints of economy, safety, and physical properties of the resulting resin composition.

As the anion or anionic compound represented by X in the above general formula, hydroxyl ion ($OH^-$), fluorine ion ($F^-$), chlorine ion ($Cl^-$), and the like can be mentioned as examples. These anion elements or anionic compounds may be used either singly or in combination. In the invention, a carbonic acid-containing apatite obtainable by substituting part of the hydrogenphosphate ion ($HPO_4^{2-}$), phosphate ion ($PO_4^{3-}$) or X in the above general formula with a carbonate ion ($CO_3^{2-}$) may be used.

Among the above apatite type compounds, hydroxyapatite (X representing hydroxyl ion), fluorinated apatite (a part or all of X representing fluorine ion), chlorinated apatite (a part or all of X representing chlorine ion), a carbonic acid-containing hydroxyapatite, carbonic acid-containing fluorinated apatite and carbonic acid-containing chlorinated apatite and a mixture thereof, each containing calcium as the metal element ($M_2$) are used most preferably in the present invention.

Examples of such an apatite type compound-forming component (raw material) include phosphoric acid-based metal compounds and mixtures of a phosphoric acid-based metal compound and a non-phosphoric acid-based metal compound. In the invention, mixtures of a phosphoric acid-based metal compound and a non-phosphoric acid-based metal compound are more preferred. In the invention, a molar ratio of the metal element to phosphorus may be from 0.9 to 10.0, more preferably from 1.2 to 5.0, still more preferably from 1.5 to 2.0, most preferably 1.55 to 1.75.

Examples of the phosphoric acid of the above-described phosphoric acid-based metal compound include orthophosphoric acid, pyrophosphoric acid, tripolyphosphoric acid, metaphosphoric acid, phosphorous acid and hypophosphorous acid.

More specific examples of the phosphoric acid-based metal compound include calcium monohydrogenphosphate ($CaHPO_4 \cdot mH_2O$, with the proviso that $0 \leq m \leq 2$), calcium dihydrogendiphosphate ($CaH_2P_2O_7$), calcium bis(dihydrogenphosphate) monohydrate ($Ca(H_2PO_4)2 \cdot H_2O$), calcium diphosphate (α- and β-$Ca_2P_2O_7$), tricalcium phosphate (α- and β-$Ca_3(PO_4)_2$), tetracalcium phosphate ($Ca_4(PO_4)_2O$) octacalcium phosphate pentahydrate ($Ca_8H_2(PO_4)_6 \cdot 5H_2O$), calcium phosphite monohydrate ($CaHPO_3 \cdot H_2O$), calcium hypophosphite ($Ca(H_2PO_2)_2$), magnesium secondary phosphate trihydrate ($MgHPO_4 \cdot 3H_2O$), magnesium tertiary phosphate octahydrate ($Mg_3(PO_4)_2 \cdot 8H_2O$) and barium phosphate dibasic ($BaRFO_4$), and the like. Among them, calcium monohydrogenphosphate ($CaHPO_4 \cdot mH_2O$, with the proviso that $0 \leq m \leq 2$) is preferably employed in the present invention from the viewpoint of excellent economy and physical properties, and particularly, anhydrous calcium monohydrogen phosphate ($CaHPO_4$) and calcium monohydrogenphosphate dihydrate ($CaHPO_4 \cdot 2H_2O$) are preferably employed. These phosphorus-base metal compounds may be used either singly or in combination. When they are used in combination, combination of compounds containing same kinds of metal elements such as combination of calcium monohydrogenphosphate dihydrate ($CaHPO_4 \cdot 2H_2O$) and calcium dihydrogendiphosphate ($CaH_2P_2O_7$) and combination of compounds containing different kinds of metal elements such as combination of calcium monohydrogenphosphate dihydrate (CaHPO$_4$.2H$_2$O) and magnesium secondary phosphate trihydrate (MgHPO$_4$.H$_2$O) can be mentioned as examples. Either can be used without any problem.

The phosphoric acid-based metal compound for use in the invention, for example, calcium monohydrogenphosphate (CaHP$_4$O.mH$_2$O with the proviso that $0 \leq m \leq 2$) is available by a known process by mixing a phosphoric acid compound and a calcium compound in the presence of water as illustrated in the state diagram of CaO—H$_2$O—P$_2$O$_5$ system described in "Phosphorus and its Compounds, 1 (1958) by Van Wazer. More specifically, such a compound may be obtained by adding an alkali phosphate solution and a calcium chloride solution dropwise to a solution of potassium dihydrogenphosphate, followed by reacting them; or mixing calcium carbonate or calcium hydroxide with an aqueous solution of phosphoric acid.

The non-phosphoric acid-based metal compounds in the invention is not particularly limited insofar as they are compounds other than the above phosphoric acids and capable of forming compounds with a metal element. Examples include inorganic metal compounds, e.g., metal hydroxides (such as calcium hydroxide, magnesium hydroxide, strontium hydroxide, barium hydroxide, lithium hydroxide, sodium hydroxide, potassium hydroxide, aluminum hydroxide, iron hydroxide and manganese hydroxide); metal chlorides (such as calcium chloride, magnesium chloride, strontium chloride, barium chloride, lithium chloride, sodium chloride, potassium chloride, aluminum chloride, iron chloride and manganese chloride); metal fluorides (such as calcium fluoride, magnesium fluoride, barium fluoride, strontium fluoride, lithium fluoride, sodium fluoride, potassium fluoride, and aluminum fluoride), metal bromides (such as calcium bromide), metal iodides (calcium iodide, potassium iodide, and copper iodide), metal carbides (such as calcium carbide), metal oxides (such as calcium oxide and magnesium oxide), metal carbonates (such as calcium carbonate, magnesium carbonate, strontium carbonate, barium carbonate, lithium carbonate, sodium carbonate, potassium carbonate, and aluminum carbonate), metal sulfates (such as calcium sulfate), metal nitrates (such as calcium nitrate) and metal silicates (calcium silicate and sodium hexafluorosilicate); compounds of a metal element, and compounds of a metal element with a monocarboxylic acid (such as calcium acetate, copper acetate, calcium benzoate and calcium stearate); compounds of a metal element and a dicarboxylic acid (such as calcium oxalate and calcium tartrate) and compounds of a metal element and a tricarboxylic acid (such as calcium citrate). In the invention, these non-phosphoric acid-based metal compounds may be used either singly or in combination. When at least two of them are combined, compounds containing the same metal elements, for example, calcium hydroxide and calcium carbonate, may be mixed or compounds containing different metal elements, for example, calcium carbonate and magnesium hydroxide, may be mixed. Among these compounds, metal hydroxides, metal fluorides, metal chlorides, metal carbonates, and metal oxides and mixtures thereof are preferably used because of excellent economy and physical properties. Particularly, hydroxides, fluorides, chlorides, and carbonates of a metal belonging to Group 2 of the periodic table such as calcium, magnesium, strontium, or barium, and mixtures thereof are more preferred. Among them, hydroxides, fluorides, chlorides, carbonates, and oxides of calcium and mixtures thereof are most preferably employed.

The process for producing the non-phosphoric acid-based metal compounds is not particularly limited and calcium carbonate, for example, may be either a crushed product of natural material or chemically synthesized one. Moreover, the crystal morphology and shape are also not particularly limited and calcium carbonate, for example, may be any of heavy calcium carbonate, light calcium carbonate, colloidal calcium carbonate, aragonite-type calcium carbonate, vaterite-type calcium carbonate, needle-type calcium carbonate, or a mixture thereof.

The phosphoric acid-base metal compounds and non-phosphoric acid-based metal compounds which are the apatite type compound-forming components may be primary particles, those forming secondary particles owing to the agglomeration of the primary particles, or mixtures thereof. Most preferred are those forming secondary particles derived from the phosphoric acid-base metal compounds. The average particle size of the primary particles constituting the secondary particles is from 0.01 to 1 μm, more preferably from 0.01 to 0.5 μm, and the average particle size of the secondary particles is from 0.1 to 50 μm, more preferably from 0.1 to 25 μm, most preferably 0.1 to 10 μm. In addition, the maximum particle size of the secondary particles is preferably 50 μm or less, more preferably 30 μm or less, most preferably 10 μm or less. The average particle size and maximum particle size may be measured by a laser diffraction/scattering type particle size distribution apparatus or by observation through a scanning electronic microscopy (SEM) with dispersing the apatite type compound-forming component in pure water or an alcohol. The following will explain more concretely the method of measuring by a laser diffraction/scattering type particle size distribution apparatus. An apatite type compound-forming component (20 mg) is dispersed in pure water (10 ml) and subjected to ultrasonication to prepare a measuring sample. Using pure water alone, a blank sample is measured by the laser diffraction/scattering type particle size distribution apparatus. Based on the particle size distribution obtained, the average particle size is calculated according to the following equation.

$$\text{Average particle size } (\mu m) = \Sigma d_i \cdot n_i / \Sigma n_i$$

wherein $d_i$ is particle size (μm) and $n_i$ is frequency (%).

Moreover, the maximum particle size is determined as a maximum particle size at which the frequency of the particle size distribution obtained as above becomes 0.01% or less. When the average particle size or maximum particle size of the apatite type compound-forming component is out of the above range, care must be taken at the handling or the moldability, mechanical properties, and durability of the resulting polyamide resin composition is not necessarily satisfactory.

The specific surface area of the phosphoric acid-base metal compound or non-phosphoric acid-base metal compound which is the apatite type compound-forming component of the invention is from 0.1 to 100 m$^2$/g, more preferably 0.5 to 50 m$^2$/g, still more preferably 1 to 25 m$^2$/g, most preferably 2 to 20 m$^2$/g. Particularly, it is preferred that the specific surface area of the phosphoric acid-base metal compound is within the above range. The specific surface area can be determined according to BET method. More specifically, it can be determined by vacuum-degassing an apatite type compound-forming component (0.5 g) at 40° C. under a condition of 10$^{-4}$ mmHg for 24 hours and then measuring by a specific surface area measuring apparatus using nitrogen gas as a gas to be absorbed. When the specific surface area of the apatite type compound-forming component is out of the range, care must be taken at the handling or the moldability, mechanical properties, and durability of the resulting polyamide resin composition is not necessarily satisfactory.

As the higher fatty acid metal salt (C)(i), a higher saturated fatty acid metal salt, a higher unsaturated fatty acid metal salt, or a mixture thereof may be preferably used.

The higher saturated fatty acid metal salt is represented by the following general formula.

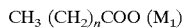

CH$_3$(CH$_2$)$_n$COO (M$_1$)

wherein n=8 to 30 and, as the metal element (M$_1$), an element of Group 1, 2, or 3 of the periodic table, zinc, and aluminum, or the like is preferably used.

Among them, more preferred examples include lithium salts, sodium salts, magnesium salts, calcium salts, zinc salts, aluminum salts and the like of capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid, or mixtures thereof.

As the higher unsaturated fatty acid metal salt, preferably used is a metal salt of an unsaturated fatty acid having 6 to 22 carbon atoms with an element of Group 1, 2, or 3, zinc, aluminum, or the like. Among them, more preferred examples include lithium salts, sodium salts, magnesium salts, calcium salts, zinc salts, aluminum salts and the like of undecylenic acid, oleic acid, elaidic acid, cetoleic acid, erucic acid, brassidic acid, sorbic acid, linoleic acid, linolenic acid, arachidonic acid, stearolic acid, 2-hexadecenic acid, 7-hexadecenic acid, 9-hexadecenic acid, gadoleic acid, gadoelaidic acid, and 11-eicocenic acid, or mixtures thereof.

The metal halide constituting the mixture (C) (ii) of the invention is a salt between halogen and a metal element of Group 1 or 2 of the periodic table, and preferred examples include potassium iodide, potassium bromide, potassium chloride, sodium iodide, sodium chloride, and the like, or mixtures thereof. Among them, most preferred are potassium iodide, potassium bromide and a mixture thereof.

Examples of the copper compound constituting the mixture (C) (ii) of the invention include halides, sulfate, acetate, propionate, benzoate, adipate, terephthalate, salicylate, nicotinate, stearate of copper, chelate compounds such as ethylenediamine and ethylenediaminetetraacetic acid of copper, and the like or mixtures thereof. Among them, preferred are copper iodide, cuprous bromide, cupric bromide, cuprous chloride, and copper acetate.

The metal halide and the copper compound are used in combination, and the mixing ratio of the metal halide and In the copper compound is preferably within the range of 0.1/1 to 200/1, more preferably the range of 0.5/1 to 100/1, most preferably 2/1 to 40/1, as a molar ratio of halogen to copper from the viewpoint of the improvement of heat resistance and corrosion at production.

The mixing amount of the higher fatty acid metal salt (C)(i) and/or the mixture (ii) of the metal halide and the copper compound is, relative to 100 parts by weight of a polyamide, from 0.01 to 20 parts by weight, preferably 0.01 to 10 parts by weight, more preferably 0.25 to 5 parts by weight, most preferably 0.05 to 1 parts by weight. When the mixing amount of the compound (C) is less than 0.01 part by weight, moldability heat-resistant ageing property, and the like are not so improved that the object of the invention is achieved and thus the case is not preferred. When the amount exceeds 20 parts by weight, silver-like spots occur on the surface of the molded product and the appearance tends to be deteriorated. Also, the mechanical properties of the molded product tends to be deteriorated, and thus the case is not preferred.

The polyamide resin composition of the invention may be mixed with other resin. Preferred other resin is at least one resin selected from polyphenylene ether resins, polyoxymethylene resins, aromatic polyester resins, aromatic polycarbonate resins, polyarylene sulfide resins, polyolefin resins, styrene resins, acrylic resins, and rubbers. Particularly preferred is a mixture with a polyphenylene ether resin. Moreover, a conventional polyamide resin may be incorporated into the polyamide resin composition of the invention.

A preferred polyphenylene ether resin of the invention may be a polymer comprising a repeating unit represented by the following formula:

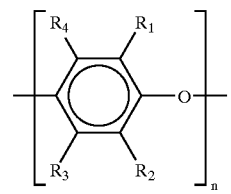

wherein R$_1$, R$_2$, R$_3$, and R$_4$ each independently represent a monovalent substituent selected from hydrogen atom, halogen atoms, alkyl groups, alkoxy groups, and haloalkyl groups or haloalkoxy groups having at lest two carbon atoms between the halogen atom and the phenyl ring and containing no tertiary α-carbon, and n is an integer showing polymerization degree. Preferably, R$_1$ and R$_2$ each is an alkyl group having 1 to 4 carbon atoms, and R$_3$ and R$_4$ each is hydrogen atom or an alkyl group having 1 to 4 carbon atoms. Specifically, poly(2,6-dimethylphenylene-1,4-ether), poly(2,6-diethylphenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-chloro-6-bromophenylene-1,4-ether), poly(2-chloro-6-ethylphenylene-1,4-ether), poly(2-methylphenylene-1,4-ether), poly(2-chlorophenylene-1,4-ether), poly(2-methyl-6-phenylphenylene-1,4-ether), poly(2-bromo-6-phenylphenylene-1,4-ether), poly(2,3,6-trimethylphenylene-1,4-ether), copolymers thereof, copolymers of these polyphenylene resins to which a styrene compound is grafted, or mixtures thereof may be mentioned.

As the styrene compound to be grafted to the above polyphenylene ether resin, styrene, α-methylstyrene, vinylstyrene, chlorostyrene, or the like may be mentioned.

The process for producing the above polyphenylene ether resin may be any of conventional methods without particular limitation, and the resin can be easily produced by subjecting 2,6-xylenol to an oxidation polymerization with using a complex between a cuprous salt and an amine as a catalyst according to the method by Hay described in U.S. Pat. No. 33,086,874, for example. Alternatively, the resin can be easily produced according to the methods described in U.S. Pat. Nos. 33,086,875, 3,257,357, and 3,257,358, Japanese Patent Publication No. 17880/1977, Japanese Patent Laid-Open Nos. 51197/1975 and 152628/1988, and so forth.

In the invention, use can be made of a modified polyphenylene ether resin wherein the above polyphenylene ether resin is modified with a compound having, for example, amino group, carboxyl group, epoxy group, or the like to incorporate the group into the molecule of the polyphenylene ether resin. In this case, it is more preferred to effect a graft polymerization in the presence of a catalyst for radical polymerization with heating under a temperature condition of 150 to 350° C.

The polyphenylene ether resin for use in the invention has preferably an intrinsic viscosity of about 0.10 to about 1.0 dl/g, measured under conditions at 25° C. in chloroform. More preferred is from about 0.25 to about 0.75 dl/g.

The mixing amount of the resin other than the polyamide is preferably from 1 to 300 parts by weight, more preferably 1 to 100 parts by weight, most preferably 10 to 100 parts by weight, relative to 100 parts by weight of the polyamide. When the mixing amount is less than 1 part by weight, mechanical properties, dimensional stability, impact resistance, and the like at water absorption are so improved that the object of the invention is achieved and thus the case is not preferred. When the amount exceeds 300 parts by weight, the deterioration of moldability, strength, toughness, and the like occurs and thus the case is not preferred.

The process for producing the polyamide composite of the invention may be any of:

(Process 1) a process of incorporating an apatite type compound into a polyamide-forming component, followed by polymerization of a polyamide;

(Process 2) a process of incorporating an apatite type compound into a polyamide according to a melt-kneading method;

(Process 3) a process of incorporating an apatite type compound-forming component (raw material) into a polyamide-forming component (another raw material), followed by polymerization of a polyamide and synthesis of an apatite type compound;

(Process 4) a process of using polyamide composite pellets obtained by any of the above (Process 1) to (Process 3) as masterbatch and mixing the pellet with polyamide pellets or other resin by melt-kneading or pellet blending; or a process wherein these processes are combined.

Among the processes, preferred is (Process 3). Particularly, it includes the process of heating the mixture of the polyamide-forming component and apatite type compound-forming component under reduced pressure, normal pressure, or a pressurized condition to polymerize the polyamide-forming component in the presence of the apatite type compound-forming component and then synthesizing the apatite-type compound; or the process of reacting the apatite-type-forming component in the presence of the polyamide-forming component and then polymerizing the polyamide. More preferred is a process of reacting the mixture of the polyamide-forming component and apatite type compound-forming component to allow the polymerization of the polyamide and the synthesis of the apatite type compound to proceed simultaneously at 40 to 300° C. under reduced pressure, normal pressure, or a pressurized condition.

Examples of the process for producing the apatite type compound used in the above (Process 1) or (Process 2) include wet synthesis, hydrothermal synthesis, and dry synthesis which are conventionally employed.

The wet synthesis is a process of using an aqueous calcium salt solution and an aqueous phosphoric acid salt solution as the apatite-type-forming component and reacting them to obtain calcium phosphate having an atomic weight ratio of Ca/P=1.40/1 to 1.67/1. As a specific example thereof, there may be mentioned a process disclosed in Japanese Patent Laid-Open No. 167209/1989, i.e., a process of maturing hydroxyapatite formed by maintaining an aqueous suspension of calcium chloride and dipotassium hydrogen phosphate under conditions of pH 4 or higher and about 70° C.

As a specific example of the hydrothermal synthesis, there may be mentioned a process disclosed in Japanese Patent Publication No. 51485/1984, i.e., a process of using monocalcium hydrogen phosphate dihydrate (or monocalcium hydrogen phosphate anhydride) and calcium hydroxide as the apatite type-forming component and reacting them under hydrothermal conditions of 200 to 400° C. and 15 to 200 atm in an autoclave.

As a specific example of the dry synthesis, there may be mentioned a process disclosed in Japanese Patent Publication No. 51485/1984, i.e., a process of using octacalcium phosphate pentahydrate and calcium compound as the apatite type-forming component and subjecting them to a solid-state reaction at 1000 to 1300° C.

In the case of incorporating the apatite type compound obtained by these methods into a polyamide-forming component (Process 1) or a polyamide (Process 2), the apatite type compound may be incorporated either in a powdery form or in a state of suspending it in a hydrophilic solvent such as water or an alcohol. Moreover, the power or suspension of the apatite type compound may be mechanically crushed by means of an apparatus such as a ball mill and then incorporated into the polyamide-forming component or polyamide in a powdery or suspension state.

In the above (Process 3), the method of incorporating the polyamide-forming component with the apatite type compound-forming component may be either a process of directly mixing the polyamide-forming component in a solid form and the apatite type compound-forming component or a process of mixing an aqueous solution of the polyamide-forming component and an aqueous solution or suspension of the apatite type compound-forming component. In order to improve the dispersibility of the apatite type compound, a compound such as a dispersant or complexing agent may be added to the polyamide-forming component or apatite type compound-forming component as needed.

The mixing amount of the apatite type compound-forming component in the above (Process 3) is preferably from 0.05 to 200 parts by weight, more preferably from 0.1 to 100 parts by weight, and particularly preferred is 1 to 100 parts by weight, relative to 100 parts by weight of the polyamide-forming component. When the mixing amount of the apatite type compound-forming component is less than 0.005 part by weight relative to 100 parts by weight of the polyamide-forming component, the improving effect on the mechanical properties of the resulting molded product is not so remarkable that the object of the invention is achieved. On the other hand, when the amount exceeds 200 parts by weight, care must be taken on the problems such as the deterioration of moldability.

In the invention, no particular limitation is imposed on the nature of the above-described dispersant and any known dispersant can be employed. For example, anionic surfactants, cationic surfactants, amphoteric surfactants, nonionic surfactants, nonionic surfactants, and the like as described in pp. 232 to 237 of "Bunsan-Gyousyuu no Kaimei to Ouyou Gijutu (Elucidation of Dispersion-Agglomeration and Applied Technology)" (supervised by Fumio Kitahara, published by Techno System Co., Ltd.). Among them, anionic surfactants and nonionic surfactants are preferably employed. In particular, from the viewpoints of cost and physical properties, sodium citrate, sodium polyacrylate, ammonium polyacrylate, styrene-maleic anhydride copolymer, olefin-maleic anhydride copolymers such as ethylene-maleic anhydride copolymer, and sucrose esters such as sucrose stearate are more preferably employed.

The complexing agent is not particularly limited insofar as it is a compound forming a complex with a metal ion. Examples include ethylenediaminetetraacetic acid, nitrilotriacetic acid, cyclohexanediaminetetraacetic acid, glycoletherdiaminetetraacetate, diethylenetriaminepentaacetic acid, citric acid, gluconic acid, tartaric acid, malic acid, succinic acid, aliphatic amines such as ethylenediamine, urea, and the like. Among them, citric acid, ethylenediaminetetraacetic acid, and ethylenediamine are particularly preferred from the viewpoints of cost and physical properties.

For the polymerization of the above polyamide, any known process can be employed. For example, usable is a process wherein a component sparingly soluble in water such as 11-aminoundecanoic acid is employed as a forming component and heated at 40 to 300° C. to effect polycondensation; a ring-opening polycondensation process wherein an aqueous solution of ε-caprolactam is employed as a forming component, mixed with a terminating agent such as a monocarboxylic acid or a reaction accelerator such as ε-aminocaproic acid as needed, and heated at 40 to 300° C. under the flow of an inert gas to effect polycondensation; or a heat-melt polycondensation process wherein an aqueous solution of a salt of a diamine and a dicarboxylic acid such as hexamethylene adipamide is concentrated under heating at a temperature of 40 to 300° C., the water vapor thus generated is maintained at a pressure between normal pressure to 20 atm, and finally, after release of the pressure, polycondensation is effected under normal or reduced pressure. Furthermore, usable are solid-phase polymerization wherein polymerization is carried out at a temperature not higher than the melting point of a solid salt of a diamine and a dicarboxylic acid and that of a polycondensate thereof; or solution polymerization wherein a dicarboxylic acid halide component and a diamine component are polycondensed in a solution; or the like. These processes may be used in combination, if necessary. Among them, in the invention, for attaining a polyamide composite having an aimed molecular weight, most preferred is the heat-melt polycondensation process or the combination of the polycondensation process and the solid-state polymerization process.

The polymerization apparatus is also not particularly limited and a known one such as an autoclave-type reactor, a tumbler type reactor, or an extrusion type reactor such as kneader can be employed.

The polymerization mode may be either a batchwise or continuous manner. The heat-melt polycondensation will be more specifically described. In the batchwise manner, a 40 to 60% by weight suspension containing an polyamide-forming component and an apatite type compound-forming component using water as a solvent is first concentrated to a concentration of 65 to 85% by weight in the vessel of a preliminary evaporator operated at a temperature of about 130 to 160° C. and a pressure of about 0.035 to 0.5 MPa. Then, the concentrated solution is transferred to an autoclave and the whole is continuously heated until the pressure in the vessel reaches about 1.5 to 2.0 MPa. Thereafter, the pressure is maintained at about 1.5 to 2.0 MPa with releasing water or gas component and, at the time when the temperature reaches about 250 to 280° C., the pressure is lowered to atmospheric pressure over a period of about 45 to 90 minutes. Thereafter, the polyamide is extruded to form a strand, which is transformed to pellets after cooling and cutting. The continuous polymerization is also well known in the art as disclosed in U.S. Pat. No. 3,947,424. More specifically, a 40 to 60% by weight suspension containing an polyamide-forming component and an apatite type compound-forming component using water as a solvent is pre-heated to about 40 to 90° C. in the vessel of a pre-heating apparatus, and then transferred to a preliminary evaporator/reactor, where the suspension is concentrated to a concentration of about 70 to 90% by weight at a pressure of about 0.1 to 0.5 MPa and a temperature of about 200 to 270° C. Then, the suspension is discharged into a flasher, wherein the pressure is slowly lowered to about atmospheric pressure, and then the suspension is discharged into a vessel which is maintained at atmospheric pressure or lower and at a temperature of about 270 to 300° C. Moisture is removed and the polyamide melted product is a extruded to form a strand, which is transformed to pellets after cooling and cutting.

According to the studies by the present inventors, in the case of using (Process 3), the interface between the polyamide and the apatite type compound is most extremely well fixed and adhered and the properties of the resulting polyamide resin composition is excellent. The apatite type compound-forming component of phosphoric acid-base metal compound, for example, calcium monohydrogen phosphate dihydrate first becomes porous by dehydration at the early stage of the polymerization of the polyamide. To the porous forming composition was adsorbed and adhered the polyamide-forming component or a polymerizing-polyamide through physical and chemical interaction. Then, the porous apatite type compound-forming component changes into the apatite type compound as the process proceeds. In the process, a reaction of transforming from porous substance to fine particles occurs and finally particles having a size of several tens to hundred nm are formed, which is homogeneously dispersed in the polyamide. As is understood from the formation mechanism, the apatite type compound-forming component, particularly the phosphoric acid-base metal compound is preferably porous as described above, and there is a tendency that a smaller average particle size and maximum particle size results in a better properties of the resulting polyamide composite.

In the case of incorporating a conventional additive for the purpose of improving the properties of the polyamide and imparting functionality to it, particularly in the case of incorporating an additive of a compound containing a metal element, it is found that the incorporation of the additive at the time when the apatite type compound-forming component remains results in the inhomogeneous dispersion of the apatite type compound formed or the presence of partially large particles having a size of several tens μm in the polyamide, the reasons being uncertain. In addition, there arise problems that the molded product obtained from the composition exhibits not only no achievement of the improvement of the properties and the impartment of functionality which are objects of the invention but also an insufficient improvement of strength and rigidity and a remarkable decrease of toughness. Based on these results, the present inventors have found that, in the case of incorporating an additive compound, especially a compound containing a metal element for the purpose of improving the properties and imparting functionality, the incorporation of the additive after the completion of the formation of the apatite type compound results in a polyamide resin composition having aimed properties and functionality, wherein an apatite type compound of fine particles having a size of several tens to hundred nm is homogeneously dispersed in the polyamide.

According to the studies by the inventors, in the case of (Process 3), for example, polymerization by heat-melt polycondensation in the above batchwise or continuous manner using an equimolar salt of hexamethylenediamine and adipic acid as the polyamide-forming component and a mixture of calcium monohydrogen phosphate and calcium carbonate and/or calcium fluoride as the apatite type compound-forming component, it is confirmed that the apatite type compound-forming component scarcely remains at the time when the step of concentration is finished.

The process for producing the polyamide resin composition of the invention may be any process of incorporating component (C) in a step after the completion of the formation of the apatite type compound. More specifically, there may be mentioned a process of incorporating component (C) in the step of producing a polyamide composite (Process 1) wherein an apatite type compound is incorporated and then a polyamide is polymerized; a process of incorporating component (C) in the step of producing a polyamide composite (Process 2), wherein an apatite type compound is incorporated into a polyamide according to a melt-kneading method; a process of incorporating component (C) in a step after the completion of the formation of the apatite type compound in (Process 3); or a process wherein these processes are combined. Component (C) may be incorporated as it is, or may be incorporated as a masterbatch prepared beforehand using a polyamide or the like, or may be incorporated as a solution or suspension in a solvent.

Among the above processes, in the case of the production by melt-kneading, a kneader generally utilized can be employed as an apparatus for melt-kneading. Examples of preferred kneader include a single-screw or multi-screw kneading extruder, a roll, a Banbury mixer, and the like. In particular, most preferred is a twin-screw extruder equipped with a pressure-reducing apparatus and a side-feeder apparatus.

As the method of melt-kneading, there may be mentioned a method of kneading all the components at once; a method of kneading a blend pre-kneaded beforehand, e.g., a method of further melt-kneading a pre-kneaded product of a polyamide and apatite type compound with a pre-kneaded product of a polyamide and a heat-resistance improver; or a method of feeding each component successively in the mid flow of an extruder, e.g., a method of feeding successively a moldability improver, a polyphenylene ether resin, and a rubber component to a polyamide composite in the mid flow of an extruder.

As the conditions of melt-kneading, the degree of reduced pressure is preferably from about 0 to 0.07 MPa. The temperature at melt-kneading is preferably a temperature which is from 1 to 100° C. higher than the melting point or softening point of a polyamide or a resin other than a polyamide determined on differential scanning calorimetry (DSC) measurement in accordance with JIS K7121. The shearing speed at a kneader is preferably 100 (sec$^{-1}$) or more, and the average residential time at kneading is preferably from about 1 to 15 minutes. The content of solvent in the polyamide resin composition is preferably about 1% by weight or less. When each condition is out of the range, there is a possibility of decrease of productivity, deterioration of moldability, unsatisfactory appearance of the resulting molded product, or an insufficient improving effect of physical properties.

The confirmation of the apatite type compound of the present invention may be effected by a method of direct confirmation by subjecting a sample during the polymerization process, a polyamide composite or polyamide resin composition, or a molded product thereof to wide-angle X-ray diffraction, infrared absorption spectrum, or the like, or a method of confirmation by eluting the polyamide or other mixed resin with a solvent capable of dissolving the polyamide or other mixed resin to separate the apatite type compound and subjecting the apatite type compound thus separated to wide-angle X-ray diffraction, infrared absorption spectrum, or the like.

As the solvent capable of dissolving the polyamide and other resin, the solvents described in, for example, No. VII (Solvents and Non-solvents for Polymers) of "POLYMER HANDBOOK Third Edition" (supervised by J. Brandrup and E. H. Immergut/A Wiley-Interscience Publication). In the invention, it is preferred to employ phenol solvent as the solvent capable of dissolving a polyamide. In the case that other resin is a polyphenylene resin, for example, use of chloroform solvent is preferred as the soluble solvent. Specifically, the operation for dissolution may be multi-step operation of dissolving the polyphenylene resin first with using a sufficient amount of chloroform solvent, and then dissolving the polyamide with using a sufficient amount of phenol solvent.

Although the apatite type compound of the present invention may be either crystalline or amorphous apatite type compound, the crystalline one is more preferred from the viewpoint of physical properties. Specifically, the confirmation of crystallinity of the apatite-type compound may be effected by measuring wide-angle X-ray diffraction using copper Kα (wavelength λ=0.1542 nm) as a radiation source of X-ray and confirming the existence of a (002) plane peak at a diffraction angle (2θ) of 25.5 to 26.5° and the existence of a (300) plane peak at a diffraction angle (2θ) of 32.5 to 33.5°. In the invention, a crystalline apatite type compound thus confirmed is particularly preferred.

The content of the apatite type compound of the invention is preferably from 0.05 to 200 parts by weight, more preferably from 0.1 to 100 parts by weight, particularly preferably from 1 to 100 parts by weight relative to 100 parts by weight of a polyamide. The content of the apatite type compound can be determined, for example, from an ignition loss measured in accordance with JIS R3420 using a polyamide composite. Moreover, the content of the apatite type compound can be also determined from a polyamide composite, or even a polyamide resin composition or a molded product thereof by combining the above ignition loss and a solvent extraction, NMR, infrared absorption spectrum, or the like as needed. When the content of the apatite type compound is less than 0.05 parts by weight relative to 100 parts by weight of a polyamide, an improving effect of the resulting molded product is not so remarkable that the object of the invention is achieved. On the other hand, when the content exceeds 200 parts by weight, care must be taken on the problem of deterioration of moldability.

In the apatite type compound of the invention, the ratio of the metal element to phosphorus is preferably from 0.9 to 10.0, more preferably from 1.2 to 5.0, particularly preferably from 1.3 to 2.5, as a molar ratio. When the fu ratio is less than 0.9, inclusion of air babbles or foaming L tends to occur at extrusion or molding, which presumably H lowers the yield of the molded product. When the ratio exceeds 10.0, on the other hand, toughness tends to be deteriorated.

The apatite type compound of the invention contains an organic substance, and the organic substance must be contained in an amount of 0.5 to 100 parts, preferably 1 to 100 parts by weight, more preferably 3 to 75 parts by weight, particularly preferably 4 to 50 parts by weight per 100 parts by weight of the apatite type compound. Since the organic substance is included inside or surface of the apatite type compound by physical or chemical interaction such as an ionic bonding reaction, an adsorption reaction or a grafting reaction, the organic substance has a nature that it does not dissolve or elute into phenol solvent even when an operation for dissolution is conducted with using phenol solvent capable of dissolving a polyamide. This nature extremely enhances fixing and adhesiveness between the apatite type compound and the polyamide which is a matrix. When the amount of the organic substances is less than 0.5 part by weight per 100 parts by weight of the apatite type compound, there is a possibility that the toughness of the resulting molded product decreases largely. When the amount exceeds 100 parts by weight, on the other hand, the moldability tends to be deteriorated.

The apatite type compound of the invention preferably has an average particle size of 0.01 to 1 μm, more preferably 0.01 to 0.5 μm. In the invention, the average particle size can be determined by electron microphotographic observation and the average particle size is calculated as described below. That is, an ultra thin piece cut out from the polyamide composite, the polyamide resin composition, or the molded product is photographed under transmission electron microscope (TEM:×50,000 or 100,000 magnification) and the particle size $d_i$ (μm) and the number $n_i$ of the particles are determined, followed by calculation of the average particle size based on the following equation.

$$\text{Average particle size} = \Sigma d_i \cdot n_i / \Sigma n_i$$

The dispersing mode of the polyamide and other resin in the mixture can be observed on an electro microphotograph. More specifically, the dispersing mode of the mixture of a polyamide and polyphenylene ether resin, for example, can be observed with an ultra thin piece prepared according to staining solid method with osmium tetraoxide and/or ruthenium tetraoxide using transmission electron microscope (TEM).

The dispersing mode may be either the case that a polyamide constitutes a continuing phase and other resin constitutes a dispersing phase or the case that the other resin constitutes a continuing phase and the polyamide constitutes a dispersing phase, but since the object of the invention can be more effectively achieved, it is preferred that the polyamide constitutes a continuing phase and the other resin constitutes a dispersing phase.

The average particle size of the dispersing phase is from 0.01 to 10 μm, preferably from 0.1 to 5 μm. When the average particle size is out of the above range, impact resistance tends to decrease. The average particle size of the resin can be determined by electron microphotographic observation of an ultra thin piece prepared according to the above staining solid method and the average particle size is calculated as described below. That is, an ultra thin piece cut out from the resin composition or the molded product thereof is photographed under transmission electron microscope and the particle size $d_i$ (μm) of the dispersing phase and the number $n_i$ of the particles are determined, followed by calculation of the average particle size based on the following equation.

$$\text{Average particle size} = \Sigma d_i \cdot n_i / \Sigma n_i$$

In the case where the particle does not seem to have a spherical shape, the longer diameter and shorter diameter thereof are measured and the half of the sum of these diameters is designated as the particle size. In addition, for the calculation of the average particle size, the sizes of at least 2000 particles must be measured.

The apatite type compound of the invention shows a high affinity to a polyamide. Therefore, it is preferred that 50% by weight or more, preferably 75% by weight or more, most preferably 90% by weight or more of the apatite type compound is present in the polyamide in a homogeneously dispersed state, from the viewpoint that the aimed improving effect is achieved by the existence in the polyamide.

To the polyamide resin composition of the invention, a moldability improver other than the higher fatty acid metal salts may be added. The above moldability improver is at least one compound selected from the compounds consisting of phosphate esters, phosphite esters, higher fatty acids, higher fatty acid esters, higher fatty acid amide compounds, polyalkylene glycols or terminal-modified compounds thereof, low-molecular-weight polyethylene or oxidized low-molecular-weight polyethylene, substituted benzylidene sorbitols, polysiloxanes, caprolactones, and inorganic crystal-seeding agents.

For the purpose of preventing heat deterioration and discoloration at heating and improving heat-resistant aging property and weathering resistance, a deterioration-inhibiting agent may be added to the polyamide resin composition of the invention. The above deterioration-inhibiting agent is at least one compound selected from phenol-type stabilizers such as hindered phenol compounds, phosphite-type stabilizers, hindered amine-type stabilizers, triazine-type stabilizers, and sulfur-type stabilizers.

A coloring agent may be added to the polyamide resin composition of the invention. The above coloring agent is at least one coloring agent selected from dyes such as Nigrosine; pigments such as titanium oxide or carbon black; particles of metals such as aluminum, colored aluminum, nickel, tin, copper, gold, silver, platinum, iron oxide, stainless steel, and titanium; pearl pigments made of mica; metallic pigments such as color graphites, color glass fibers, and color glass flakes; and the like.

To the polyamide resin composition of the invention may be added conductive carbon black. The above carbon black is at least one carbon black selected from acetylene black, Ketjenblack, carbon nanotube, and the like. Among them, preferred is one having a good linear structure and a large cohesive density.

A flame retardant may be incorporated into the polyamide resin composition. The flame retardant is preferably a non-halogen-type flame retardant or a bromine-type flame retardant.

The above non-halogen-type flame retardant is at least one flame retardant selected from phosphorus-type flame retardants such as red phosphorus, ammonium phosphate, and ammonium polyphosphate; inorganic compound-type flame retardants including metal hydroxides or inorganic metal compounds such as aluminum hydroxide, magnesium hydroxide, dolomite, hydrotalcite, calcium hydroxide, barium hydroxide, basic magnesium carbonate, zirconium hydroxide, tin oxide, zinc stannate, and zinc hydroxystannate, boric acid compounds such as zinc borate, zinc metaborate, and barium metaborate, and the like; triazine-type flame retardants such as melamine, melam, melem, mellon (a product derived from elimination of three ammonia molecules from three melem molecules at 300° C. or higher), melamine cyanurate, melamine phosphate, melamine polyphosphate, succinoguanamine, adipoguanamine, methylglutaroguanamine, and melamine resin; silicone-type flame retardants such as silicone resins, silicone oils, and silica.

The above bromine-type flame retardant is at least one flame retardant selected from the compounds consisting of brominated polystyrenes, brominated polyphenylene ethers, brominated bisphenol-type epoxy polymers, and brominated crosslinked aromatic polymers.

An inorganic filler may be incorporated into the polyamide resin composition of the invention. The above inorganic filler is at least one inorganic filler selected from glass fibers, carbon fibers, wollastonite, talc, mica, kaolin, barium sulfate, calcium carbonate, apatite, sodium phosphate, fluorite, silicon nitride, potassium titanate, molybdenum disulfide, and the like.

The present inventors presume that, in the case of incorporating the additive conventionally used for these polyamide resins, a similar aimed improving effect can be also attained by incorporating it after the formation of the apatite type compound as in the invention.

Since the polyamide resin composition of the invention is excellent in various kinds of moldability, it can be well molded and processed even by the use of molding methods generally known for plastics such as pressing, injection molding, gas-assisted injection molding film forming, welding, extrusion, blow molding, film forming, blow molding, multilayer forming, expansion molding, melt spinning, and the like. In addition, the molded product obtained from the resin composition of the invention is excellent in rigidity, strength, toughness, weathering resistance, heat-resistant aging property, and the like as compared with conventional resin compositions, so that it is expected to employ the resin composition for the application to various parts such as automobile parts, electronic/electrical parts, industrial machine parts, various gears, and for extrusion uses.

EXAMPLES

The present invention will be illustrated in greater detail with reference to the following Examples. It should however be noted that the present invention is not limited to the Examples unless exceeding the gist of the present invention. Physical properties described in the following Examples and Comparative Examples were evaluated as follows:

1. Characteristics of the Polyamide-Forming Component and Apatite Type Compound-Forming Component (1-1) Content (% by Weight) of the Apatite Type Compound-forming Component:

It was calculated from the mixing amounts of the polyamide-forming component and apatite type compound-forming component added.

(1-2) Molar Ratio of the Metal Element to Phosphorus in the Apatite Type Compound-forming Component:

A molar ratio of the metal element to phosphorus was calculated from the amount of the apatite type compound-forming component incorporated and molecular weight thereof.

2. Characteristics of the Polyamide Resin Composition (2-1) Weight-average Molecular Weight (Mw):

It was determined by gel permeation chromatography (GPC). As an apparatus, detector, solvent and column, "HLC-8020" manufactured by TOSOH CORPORATION, a C) differential refractometer (RI), hexafluoroisopropanol (HFIP) and two TSKgel-GMHHR-Hs and one G1000HHR manufactured by TOSOH CORPORATION were employed, respectively. The flow rate of the solvent was 0.6 ml/minute and sample concentration was 1 to 3 (mg of sample)/l (ml of solvent). The sample solution was filtered to remove the insoluble matter, whereby a measurement sample was obtained. Based on the resulting elution curve, the weight average molecular weight (Mw) was calculated in terms of polymethyl methacrylate (PMMA).

(2-2) Quantitative Determination of the Content of the Apatite Type Compound (% by Weight):

A polyamide resin composition was dried at 100±20° C. for 8 hours, followed by cooling. One g of the composition was weighed on a platinum boat and incinerated in an electric oven of 650±20° C. After cooling, the residue was weighed and the content of the apatite type compound was determined.

(2-3) Molar Ratio of the Metal Element to Phosphorus:

(a) Quantitative Determination of the Metal Element:

Determination of the metal element will next be described using calcium as an example, which can similarly be applied to the determination of another metal element.

The polyamide resin composition (0.5 g) was weighed on a platinum boat and incinerated in an electric oven of 500° C. After cooling, 5 ml of hydrochloric acid and 5 ml of pure water were added thereto and the whole was dissolved by boiling on a heater. The resulting solution was cooled again and then pure water was added to make the solution 500 ml. Determination was conducted at a wavelength of 317.933 nm by using "IRIS/IP" manufactured by Thermo Jarrell Ash in accordance with inductively coupled plasma (ICP) emission spectrometry.

(b) Determination of Phosphorus:

The polyamide resin composition (0.5 g) was weighed, and 20 ml of concentrated sulfuric acid was added thereto, followed by wet decomposition on a heater. After cooling, 5 ml of hydrogen peroxide was added and the resulting mixture was heated on a heater to concentrate the whole amount to 2 to 3 ml. The concentrate was again cooled and pure water was added to make it 500 ml. Determination was conducted at a wavelength of 213.618 (nm) in accordance with inductively coupled plasma (ICP) emission spectrometry by using "IRIS/IP" manufactured by Thermo Jarrell Ash.

(2-4) Amount of the Organic Substance (Part by Weight/100 Parts by Weight of the Apatite Type Compound):

(a) Separation of the Apatite Type Compound:

Ten g of the polyamide resin composition was weighed and mixed with 200 ml of 90% by weight phenol. The resulting mixture was stirred at 40° C. for 2 hours. Using a centrifugal separator ("H103RLH" manufactured by Kokusan Enshinbunriki K. K.), the reaction mixture was subjected to separating operation by centrifuging at 20000 rpm for 1 hour and the supernatant solvent was removed. To the residue was added 200 ml of phenol. Then, the similar dissolving operation and separating operation using a centrifugal separator were repeated 4 times. Then, 200 ml of 99.5% by weight ethanol was added to the residue, followed by stirring at 23° C. for 2 hours, and then, separating operation was conducted at 20000 rpm for 1 hour by using a centrifugal separator and the supernatant solvent was removed. These operations were repeated further 4 times. Thereafter, the residue was dried in a vacuum drier at 80° C. for 12 hours, whereby the aimed apatite type compound was obtained.

(b) Measurement of a Heating Loss Ratio of the Separated Apatite Type Compound:

Ten mg of the apatite type compound obtained in (a) of (2-4) was weighed and a heating loss ratio X was determined by thermogravimetric analyzer (TGA). Using "TGA-50" manufactured by Shimadzu Corporation as an apparatus, the temperature was raised from 30° C. to 550° C. at a rate of 99.9° C./min and then maintained at 550° C. for 1 hour. From the initial weight ($W_0$) at 30° C. and the final weight ($W_1$) after maintained at 550° C. for 1 hour, a heating loss ratio was calculated in accordance with the following formula.

Heating loss ratio X (part by weight/100 parts by weight of the apatite type compound)=$(W_0-W_1)\times 100/W_1$ (c) Quantitative Determination of the Organic Substance:

Three mg of the apatite type compound obtained in (a) of (2-4) was weighed and subjected to pyrolysis gas chromatography (GC) and pyrolysis GC/MS under the following conditions, whereby a pyrogram was obtained.

Pyrolysis

Apparatus: "Double shot pyrolyser PY-2010D" manufactured by Frontier Inc.

Thermal decomposition temperature: 550° C.

Gas chromatography (GC)

Apparatus: "HP-5890" manufactured by HEWLETT PACKARD

Column: "DURABOND DB-1" manufactured by J&W Inc.

(0.25 mm I.D.×30 m, film thickness: 0.25 μm)

Column temperature: 50° C.→320° C. (heating rate: 20° C./min)

Injection temperature: 320° C.

Detector temperature: 320° C.

Mass spectrum (MS)

Apparatus: "AutoMS System II" manufactured by JEOL Ltd.

Ionization: EI (70V)

Mass measurement range: m/z=10 to 400

Temperature: 200° C.

The pyrogram of pyrolysis GC thus obtained was divided into regions of retention time less than 2 minutes and retention time of 2 minutes or greater and their peak areas Sa (less than 2 minutes) and Sb (2 minutes and greater) were calculated. Using the heating loss ratio X determined in (b) of (2-4), the amount of the organic substance was calculated in accordance with the following equation.

The amount of the organic substance (part by weight/100 parts by weight of the apatite type compound)=X·Sb/(Sa+Sb)

In addition, pyrolytically decomposed components were identified based on mass spectrum (MS).

(2-5) Infrared Absorption Spectrum:

Infrared absorption spectrum of the apatite type compound obtained in (a) of (2-4) was measured. By using an apparatus "1640" manufactured by Perkin Elmer, measurement was conducted at a resolving power of 4 cm$^{-1}$.

(2-6) Confirmation of the Formation of the Apatite Type Compound According to X-ray Diffraction:

X-ray diffraction of the apatite type compound obtained in (a) of (2-4) was measured under the following conditions.

X ray: copper Kα

Wave number: 1.542 Å

Voltage of tube: 40 KV

Current of tube: 200 mA

Scanning rate: 4 deg./min

Divergence slit: 1 deg.

Scattering slit: 1 deg.

Light-intercepting slit: 0.15 mm (2-7) Measurement of Melting Point (° C.) and Melting Calorie (ΔH) (J/g):

The measurement was conducted in accordance with JIS K7121 and K7122. Determination was conducted by using "DSC-7" manufactured by Perkin-Elmer. The measuring conditions were as follows. Under a nitrogen atmosphere, about 8 mg of a sample was maintained at 300° C. for 2 minutes, cooled to 40° C. at a rate of 20° C./minute, maintained at 40° C. for 2 minutes, and heated at a rate of 20° C./minute. Melting point was determined from the peak temperature of an exothermic peak (melting peak) appearing during the final heating step. In addition, melting calorie was determined from the peak area.

3. Moldability (3-1) Molding Flowability:

Spiral flow distance (SFD) having a depth of 6 mm and a thickness of 1.5 mm was measured under the following conditions.

Injection molding machine: "IS-150E" manufactured by Toshiba Machine Co., Ltd.

Rotation number of screw: 150 rpm

Cylinder temperature: 280° C.

Injection pressure: 75 MPa (3-2) Releasing Ability:

As shown in FIG. 1, using a mold fitted with a releasing power-measuring apparatus wherein a load cell was placed onto the ejector pin for a molded product, molding was conducted under the following molding conditions. Then, 50 shots of measurement of releasing power were conducted and the average value was calculated.

Injection molding machine: "FN1000" manufactured by Nissei Jusi K. K.

Mold: Cup-shape molded product

Cylinder temperature: 280° C.

Mold temperature: 100° C. at high-temperature evaluation, and 30° C. at low-temperature evaluation Injection pressure: 40 MPa Injection time: 7 seconds Cooling time: 20 seconds (3-3) Plasticizing Ability:

Molding was conducted under the conditions similar to those in the above releasing ability evaluation with the exception of the condition described below. Then, the time required for moving the screw back was measured and an average value of the plasticizing time at 50 shots was determined.

Mold temperature: 100° C.

(3-4) Length of Burr

The burr formed from a gap of 20 μm provided at the end of a strip-shape molded product of 127×12.7×3.2 mm by injection molding machine ("PS40E" manufactured by Nissei Jushi K. K.) was measured using a microscope.

4. Preparation of Molded Product and Physical Properties Thereof

A molded product was prepared using an injection molding machine. The molded product was obtained using an apparatus "PS40E" manufactured by Nissei Jushi K. K., set at a cylinder temperature of 280° C. and a mold temperature of 80° C. under injection conditions of injection for 17 seconds and cooling for 20 seconds.

(4-1) Flexural Modulus and Flexural Strength (MPa):

They were measured in accordance with ASTM D790.

(4-2) Tensile Strength (MPa) and Tensile Elongation (%):

m They were measured in accordance with ASTM D638.

(4-3) Notched Izod Impact Strength (J/m):

It was measured in accordance with ASTM D256.

(4-4) Deflection Temperature Under Load (° C.):

It was measured in accordance with ASTM D648 under a load of 18.6 MPa.

(4-5) Surface Appearance:

Gs 60° C. was measured in accordance with JIS K7150 using a handy gloss meter "IG320" manufactured by Horiba.

Figure 2:
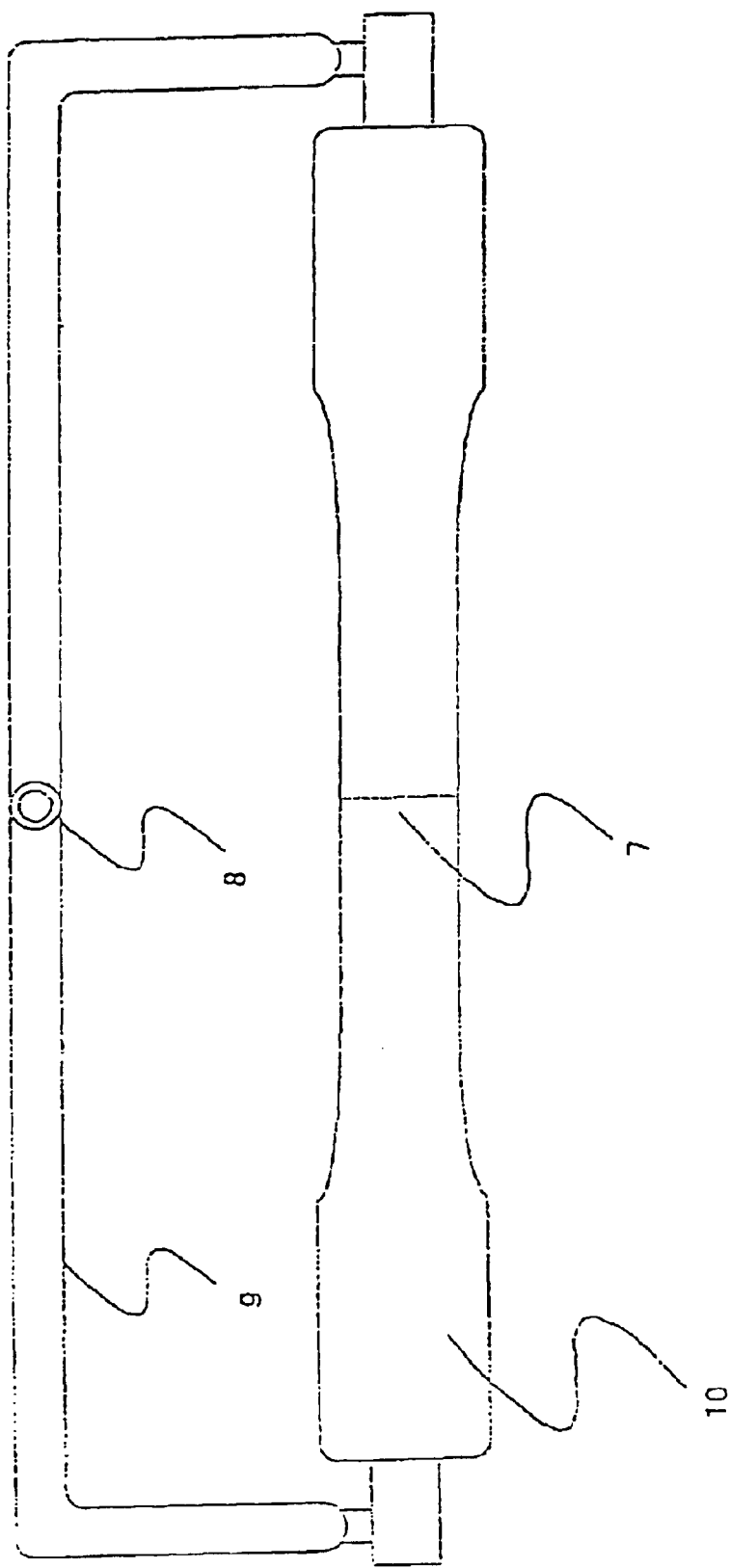
FIG. 2 is a top view of a mold for obtaining a molded product having a weld part used in Examples and Comparative Examples of the invention.

(4-6) Weld Strength:

A molded product having a weld part was prepared using a mold shown in FIG. 2 and the strength was measured in accordance with ASTM D-638.

(4-7) Hot Water-resistance:

Hot-water resistance was evaluated by measuring tensile strength in accordance with ASTM D638 after dipping of a test piece in water heated to 140° C. for 200 hours.

(4-8) Compressive Creep (mm):

It was measured in accordance with ASTM as a distortion amount of an injection molded product, which had a thickness of 3 mm and a side of 10 mm, after the product was maintained under conditions of 120° C. and 49 MPa for 100 hours.

(4-9) Reworkability:

A molded product (initial molded product) was crushed by a crasher, and molding was conducted using the resulting crushed product. The operation was repeated further four times, and tensile strength of the molded product (reworked product) finally obtained was measured.

(4-10) Heat-Resistant Aging Property:

A molded product for measuring tensile strength was maintained in a gear oven of 180° C. The molded product was taken out at a predetermined time and tensile strength was determined. Heat-resistant aging property was evaluated by determining the time when tensile strength is one-half of the initial (without aging) tensile strength (half value time).

(4-11) Discoloration by Reworking

Color tone of the molded product was measured using the initial molded product and reworked product of (4-9). Color difference between the initial molded product and reworked product (Δb: change of b value) was determined using a color-difference meter "ND-300A" manufactured by Nippon Denshoku. Smaller color difference (Δb) is judged to be good yellowing resistance.

(4-12) Water Absorption (% by Weight):

It was measured in accordance with ASTM D570 as a weight change after maintained in water of 23° C. for 24 hours.

(4-13) Molding Shrinkage (%)

The size of a flat plate obtained by injection molding using a mold having a thickness of 3 mm and a side of 130 mm was measured and a shrinkage factor was determined.

(4-14) Warpage (mm):

A flat plate obtained by injection molding using a mold having a thickness of 3 mm and a side of 130 mm was placed on a horizontal plane and the maximum gap distance from the horizontal plane was measured.

(4-15) Coating Adhesiveness:

As a coating for coating appearance and coated film thickness, "Hiepico No100" (trademark: manufactured by Nippon Oil & Fats Co., Ltd., middle coat) was coated by electrostatic coating, and the coated sample was left for 10 minutes. Then, it was baked in a hot-air oven of 140° C. for 30 minutes, then, taken out and left at room temperature for 30 minutes. Thereafter, "Neoamirac" (trademark: manufactured by Kansai Paint Co., Ltd., overcoat) was coated by electrostatic coating, and the coated sample was left for 10 minutes. Then, it was baked at 140° C. for 30 minutes, then, taken out and left at room temperature for 24 hours. The resulting test piece was used for the following evaluation.

Initial Adhesiveness:

Tape detachment was conducted so as to meet the cross cut test (100 pieces at 1 mm intervals) in accordance with JIS K5400, and the number of remaining coated films of the 100 pieces was counted.

Secondary Adhesiveness:

A test piece was dipped in a warm water of 40° C. for 10 days and then, a similar test to the above initial adhesiveness test was conducted.

(3) Coating Appearance:

Appearance of the coated surface was evaluated visually.

Production Example 1

An aqueous solution of a 50% by weight polyamide-forming component (an equimolar salt of hexamethylene-diamine and adipic acid) was prepared in an amount of 30 kg. To the aqueous solution were employed 1.3 g of acetic acid as a terminating agent, 6 kg of 25% by weight suspension of calcium monohydrogen phosphate dihydrate ($CaHPO_4.2H_2O$) having an average particle size of 3.5 μm (maximum particle size of 20 μm, average particle size of primary particles of 0.15 μm) and a specific surface area of 7.2 $m^2$/g (calcium monohydrogen phosphate dihydrate:pure water=1.5 kg:4.5 kg) and 2.32 kg of a 25% by weight suspension of heavy calcium carbonate ($CaCO_3$) having an average particle size of 1.5 μm (calcium carbonate:pure water=0.58 kg:1.74 kg) as an apatite type compound-forming component. The molar ratio of calcium to phosphorus was calculated as 1.67. The mixture of the aqueous solution of the polyamide-forming component and the suspension of the apatite type compound-forming component was partially sampled and it was air-dried to form Sample (a).

(Step 1) The mixture of the aqueous solution of the polyamide-forming component and the suspension of the apatite type compound-forming component (3.0 kg) was fed into two 5-liter autoclaves having a stirring apparatus. The atmosphere in both autoclaves were thoroughly replaced by nitrogen under a temperature of 50° C., and then the autoclaves were heated from 50° C. to about 150° C. under stirring while removing water into out of the system to prevent the pressure in the autoclaves from exceeding about 0.2 MPa, thereby about 0.7 kg of water being removed. One of two autoclaves was rapidly cooled and the content was taken out as Sample (b).

(Step 2) Then, the remaining one autoclave was heated to about 270° C. following to (Step 1). At that time, the heating was continued for about 1 hour while removing water into out of the system to prevent the pressure in the $n_i$ autoclaves from exceeding about 1.77 MPa. Thereafter, the pressure was lowered to atmospheric pressure over a period of about 1 hour, and the autoclave was rapidly cooled and the content was taken out as Sample (c).

Upon the measurement of wide-angle X-ray diffraction of Samples (a), (b), and (c), diffraction peaks of crystalline apatite type compound were observed but diffraction peak strength of the apatite-forming component (calcium monohydrogen phosphate dihydrate, calcium carbonate) was less than the detection limit and was not observed on Samples (b) and (c). On the other hand, on Sample (a), diffraction peaks showing the existence of amorphous apatite type compound was slightly observed but most diffraction peaks showed the existence of the remaining apatite type-forming component.

EXAMPLE 1

An aqueous solution of a 50% by weight polyamide-forming component (an equimolar salt of hexamethylene-diamine and adipic acid) was prepared in an amount of 30 kg. To the aqueous solution were employed 1.3 g of acetic acid as a terminating agent, 6 kg of 25% by weight suspension of calcium monohydrogen phosphate dihydrate (CaHPO$_4$.2H$_2$O) having an average particle size of 3.5 μm (maximum particle size of 20 μm, average particle size of primary particles of 0.15 μm) and a specific surface area of 7.2 m$^2$/g (calcium monohydrogen phosphate dihydrate:pure water=1.5 kg:4.5 kg) and 2.32 kg of a 25% by weight suspension of heavy calcium carbonate (CaCO$_3$) having an average particle size of 1.5 m (calcium carbonate:pure water=0.58 kg:1.74 kg) as an apatite type compound-forming component. The mixture of the aqueous solution of the polyamide-forming component and the suspension of the apatite type compound-forming component was fed into a 70-liter autoclave having a stirring apparatus. The atmosphere in the autoclave was thoroughly replaced by nitrogen under a temperature of 50° C., and then the autoclave was heated from 50° C. to about 150° C. under stirring while removing water into out of the system to prevent the pressure in the autoclaves from exceeding about 0.2 MPa, thereby about 7 kg of water being removed. Then, the autoclave was continuously heated to about 270° C. At that time, the heating was continued for about 1 hour while removing water into out of the system to prevent the pressure in the autoclaves from exceeding about 1.77 MPa. Thereafter, the pressure was lowered to atmospheric pressure over a period of about 1 hour, and then 45 g of calcium stearate as a moldability improver melted by heating was added under pressure form the upper part of the autoclave, followed by about 15 minutes of thorough stirring. Then, the stirring was stopped and the polymer was discharged from a lower part nozzle in the form of a strand, which was cooled and cut to obtain a polyamide resin composition. Foaming was hardly observed on the strand at the discharge. Using a polyamide resin composition similarly produced, molding was conducted continuously for 4 hours and the mold surface was observed but dirty substance was hardly observed. The evaluation results are shown in Table 1.

COMPARATIVE EXAMPLE 1

An aqueous solution of a 50% by weight polyamide-forming component (an equimolar salt of hexamethylenediamine and adipic acid) was prepared in an amount of 30 kg. To the aqueous solution were employed 1.3 g of acetic acid as a terminating agent, 6 kg of 25% by weight suspension of calcium monohydrogen phosphate dihydrate (CaHPO$_4$.2H$_2$O) having an average particle size of 3.5 μm (maximum particle size of 20 μm, average particle size of primary particles of 0.15 μm) and a specific surface area of 7.2 m$^2$/g (calcium monohydrogen phosphate dihydrate:pure water=1.5 kg:4.5 kg) and 2.32 kg of a 25% by weight suspension of heavy calcium carbonate (CaCO$_3$) having an average particle size of 1.5 μm (calcium a carbonate:pure water=0.58 kg:1.74 kg) as an apatite type compound-forming component. Furthermore, 45 g of calcium stearate was added thereto as a moldability improver. The mixture of the aqueous solution of the polyamide-forming component, the suspension of the apatite type compound-forming component, and the moldability improver was fed into a 70-liter autoclave having a stirring apparatus. The atmosphere in the autoclave was thoroughly replaced by nitrogen under a temperature of 50° C., and then the autoclave was heated from 50° C. to about 150° C. under stirring while removing water into out of the system to prevent the pressure in the autoclaves from exceeding about 0.2 MPa, thereby about 7 kg of water containing a large quantity of white powder being removed. Then, the autoclave was continuously heated to about 270° C. At that time, the heating was continued for about 1 hour while removing water into out of the system to prevent the pressure in the autoclaves from exceeding about 1.77 MPa. Thereafter, the pressure was lowered to atmospheric pressure over a period of about 1 hour, and then the stirring was stopped and the polymer was discharged from a lower part nozzle in the form of a strand, which was cooled and cut. The strand at the discharge foamed very much and was extremely unstable Using a polyamide resin composition similarly produced, molding was conducted continuously for 4 hours and the mold surface was observed, but attachment of a large quantity of white power was observed. The evaluation results are shown in Table 1.

EXAMPLE 2

Operations were conducted in a similar manner to Example 1 with the exception that aluminum distearate was employed instead of calcium stearate. The evaluation results are shown in Table 2.

EXAMPLE 3

Operations were conducted in a similar manner to Example 1 with the exception that aluminum tristearate was employed instead of calcium stearate. The evaluation results are shown in Table 2.

EXAMPLE 4

Operations were conducted in a similar manner to Example 1 with the exception that calcium montanate was employed instead of calcium stearate. The evaluation results are shown in Table 2.

EXAMPLE 5

Operations were conducted in a similar manner to Example 1 with the exception that sodium montanate was employed instead of calcium stearate. The evaluation results are shown in Table 2.

EXAMPLE 6

Operations were conducted in a similar manner to Example 1 with the exception that zinc stearate was employed instead of calcium stearate. The evaluation results are shown in Table 2.

EXAMPLE 7

Operations were conducted in a similar manner to Example 1 with the exception that 45 g of a lubricant mixture of calcium stearate, stearyl stearate (an ester compound of stearic acid with stearyl alcohol), and erucic amide was employed instead of 45 g of calcium stearate. The evaluation results are shown in Table 3.

EXAMPLE 8

A polyamide resin composition was obtained by blending 0.05 part by weight of a blend oil (polyethylene glycol: "PEG400" manufactured by Nippon Oil & Fats Co., Ltd.) and 0.15 part by weight of calcium montanate to 100 parts by weight of pellets of the polyamide resin composition of Example 7 using a cone-type tumbler. The evaluation results are shown in Table 3.

EXAMPLE 9

A polyamide resin composition was obtained by blending 0.05 part by weight of a blend oil (polyethylene glycol:

"PEG400" manufactured by Nippon Oil & Fats Co., Ltd.), 0.15 part by weight of calcium montanate, and 2.5 part by weight of a masterbatch (a masterbatch based on Ny6 containing 10% by weight of ethylene bisstearylamide) to 100 parts by weight of pellets of the polyamide resin composition of Example 7 using a cone-type tumbler. The evaluation results are shown in Table 3.

PRODUCTION EXAMPLE 2

An aqueous solution of a 50% by weight polyamide-forming component (an equimolar salt of hexamethylenediamine and adipic acid) was prepared in an amount of 30 kg. To the aqueous solution were employed 1.3 g of acetic acid as a terminating agent, 6 kg of 25% by weight suspension of calcium monohydrogen phosphate dihydrate ($CaHPO_4 \cdot 2H_2O$) having an average particle size of 3.5 $\mu$m (maximum particle size of 20 $\mu$m, average particle size of primary particles of 0.15 $\mu$m) and a specific surface area of 7.2 $m^2/g$ (calcium monohydrogen phosphate dihydrate:pure water=1.5 kg:4.5 kg) and 2.32 kg of a 25% by weight suspension of heavy calcium carbonate ($CaCO_3$) having an average particle size of 1.5 $\mu$m (calcium carbonate:pure water=0.58 kg:1.74 kg) as an apatite type compound-forming component. The mixture of the aqueous solution of the polyamide-forming component and the suspension of the apatite type compound-forming component was fed into a 70-liter autoclave having a stirring apparatus. The atmosphere in the autoclave was thoroughly replaced by nitrogen under a temperature of 50° C., and then the autoclave was heated from 50° C. to about 150° C. under stirring while removing water into out of the system to prevent the pressure in the autoclaves from exceeding about 0.2 MPa, thereby about 7 kg of water being removed. Then, the autoclave was heated continuously to about 270° C. At that time, the heating was continued for about 1 hour while removing water into out of the system to prevent the pressure in the autoclaves from exceeding about 1.77 MPa. Thereafter, the pressure was lowered to atmospheric pressure over a period of about 1 hour, and then the stirring was stopped and the polymer was discharged from a lower part nozzle in the form of a strand, which was cooled and cut to obtain pellets of a polyamide composite. Foaming was hardly observed on the strand at the discharge. As a result of evaluating the resulting polyamide composite, the weight-average molecular weight (Mw) was found to be 40000, and the content of the apatite type compound was found to be 10.4 parts by weight relative to 100 parts by weight of the polyamide. A molar ratio of calcium to phosphorus was calculated to be 1.66. Observation under a transmission electron microscope (TEM) at a magnitude of 50,000 showed that the apatite type compound had an average particle size of 85 nm. As a result of evaluating the apatite type compound obtained by eluting and separating operations with using a 90% aqueous phenol solution, the formation of crystalline apatite type compound can be confirmed by wide-angle X-ray diffraction. Moreover, the amount of the organic substance of the apatite type compound obtained by the eluting and separating operations was calculated to be 5.5 (parts by weight/100 parts by weight of the apatite). In addition, from the analysis results of pyrolysis GC/mass spectrum, cyclopentanone was confirmed as one pyrolytically decomposed component of the organic substance remaining in the apatite type compound.

Furthermore, from the observation of infrared absorption spectrum, a peak indicating the existence of the organic substance was confirmed at about 1548 $cm^{-1}$.

PRODUCTION EXAMPLE 3

Operations were conducted in a similar manner to Production Example 2 with the exception that 12 kg of an equimolar salt of hexamethylenediamine-adipic acid and 3 kg of an equimolar salt of hexamethylenediamine - isophthalic acid as the polyamide-forming component.

PRODUCTION EXAMPLE 4

Operations were conducted in a similar manner to Production Example 2 with the exception that 10.5 kg of an equimolar salt of hexamethylenediamineadipic acid and 4.5 kg of an equimolar salt of hexamethylenediamine-isophthalic acid as the polyamide-forming component.

PRODUCTION EXAMPLE 5

Operations were conducted in a similar manner to Production Example 2 with the exception that 2.0 kg of ε-caprolactam as the polyamide-forming component.

PRODUCTION EXAMPLE 6

Operations were conducted in a similar manner to Production Example 2 with the exception that 12 kg of an equimolar salt of hexamethylenediamine-adipic acid, 2.25 kg of an equimolar salt of hexamethylenediamine isophthalic acid, and 0.75 kg of c-caprolactam as the polyamide-forming component.

PRODUCTION EXAMPLE 7

An aqueous solution of a 50% by weight polyamide-forming component (an equimolar salt of hexamethylenediamine and adipic acid) was prepared in an amount of 30 kg. To the aqueous solution were employed 1.3 g of acetic acid as a terminating agent, 3 kg of 25% by weight suspension of calcium monohydrogen phosphate dihydrate ($CaHPO_4 \cdot 2H_2O$) having an average particle size of 3.5 $\mu$m (maximum particle size of 20 $\mu$m, average particle size of primary particles of 0.15 $\mu$m) and a specific surface area of 7.2 $m^2/g$ (calcium monohydrogen phosphate dihydrate:pure water=0.75 kg:2.25 kg), 0.88 kg of a 25% by weight suspension of heavy calcium carbonate ($CaCO_3$) having an average particle size of 1.5 $\mu$m (calcium carbonate:pure water=0.22 kg:0.66 kg), and 0.22 kg of a 25% by weight of calcium fluoride ($CaF_2$) having an average particle size of 10 $\mu$m (calcium fluoride:pure water=0.055 kg:0.165 kg) as an apatite type compound-forming component. Thereafter, operations were conducted in a similar manner to Production Example 2.

PRODUCTION EXAMPLE 8

Twenty-four kg of a 25% by weight suspension of calcium monohydrogen phosphate dihydrate ($CaHPO_4 \cdot 2H_2O$) having an average particle size of 3.5 $\mu$m (maximum particle size of 18 $\mu$m, average particle size of primary particles of 0.08 $\mu$m) and a specific surface area of 25.2 $m^2/g$ (calcium monohydrogen phosphate dihydrate:pure water=6 kg:18.0 kg) and 9.28 kg of a 25% by weight suspension of heavy calcium carbonate ($CaCO_3$) having an average particle size of 1.5 $\mu$m (calcium carbonate:pure water=2.32 kg:6.96 kg) were employed as an apatite type compound-forming component. The mixture of the aqueous solution of the polyamide-forming component and the suspension of the apatite type compound-forming component was fed into a 70-liter autoclave having a stirring apparatus. The atmosphere in the autoclave was thoroughly replaced by nitrogen under a temperature of 50° C., and then the autoclave in a tightly sealed state was heated to about 250° C. and the pressure was raised to about 4.0 MPa. The autoclave was maintained for 5 hours under the conditions. After cooling, the content was taken out and centrifugal separation and washing with pure water were repeated. Thereafter, it was dried in a nitrogen stream of 80° C. for 24 hours to obtain a white powder. The white powder was confirmed to be crystalline apatite type compound by wide-angle X-ray diffraction of the powder. Observation under a transmission electron microscope (TEM) at a magnitude of 50,000 showed that the apatite type compound was in the form of spherical particle having an average particle size of 100 nm.

To 100 parts by weight of nylon 66 ("1300" manufactured by Asahi Chemical Co., Ltd.) was added 10 parts by weight of the apatite type compound, and the mixture was melt-kneaded by means of an extruder ("TEM35" manufactured by Toshiba Machine Co., Ltd.) under a condition of 280° C. to obtain pellets of a polyamide composite.

PRODUCTION EXAMPLE 9

An apatite type compound having an average particle size of 1.0 µm (maximum particle size of 5.5 µm) and a specific surface area of 0.5 m²/g was obtained by crashing a commercial hydroxyapatite having an average particle size of 60 µm manufactured by Taihei Kagaku Sangyo K. K. using a ball mill. To 100 parts by weight of nylon 66 ("1300" manufactured by Asahi Chemical Co., Ltd.) was added 10 parts by weight of the apatite type compound, and the mixture was melt-kneaded by means of an extruder ("TEM35" manufactured by Toshiba Machine Co., Ltd.) under a condition of 280° C. to obtain pellets of a polyamide composite.

PRODUCTION EXAMPLE 10

Operations were conducted in a similar manner to Production Example 2 with only using 30 kg of an aqueous solution of a 50% by weight polyamide-forming component (an equimolar salt of hexamethylenediamine-adipic acid) mixed with 1.3 g of acetic acid as a terminating agent without using any apatite-forming component.

EXAMPLE 10

A polyamide resin composition was obtained by blending 0.05 part by weight of a blend oil ("Value 7220" manufactured by Marubishi Oil Chemical Co., Ltd.) and 0.30 part by weight of calcium montanate to 100 parts by weight of the polyamide resin composite of Production Example 2 using a cone-type tumbler, the former two components being attached to the surface of the latter. The evaluation results are shown in Table 4.

EXAMPLE 11

Operations were conducted in a similar manner to Example 10 with the exception that the polyamide composite of Production Example 3 was employed instead of the polyamide composite of Production Example 2. The evaluation results are shown in Table 4.

EXAMPLE 12

Operations were conducted in a similar manner to Example 10 with the exception that the polyamide composite of Production Example 4 was employed instead of the w polyamide composite of Production Example 2. The evaluation results are shown in Table 4.

EXAMPLE 13

Operations were conducted in a similar manner to Example 10 with the exception that the polyamide composite of Production Example 5 was employed instead of the polyamide composite of Production Example 2. The evaluation results are shown in Table 4.

EXAMPLE 14

Operations were conducted in a similar manner to Example 10 with the exception that the polyamide composite of Production Example 6 was employed instead of the polyamide composite of Production Example 2. The evaluation results are shown in Table 4.

EXAMPLE 15

Operations were conducted in a similar manner to Example 10 with the exception that the polyamide composite of Production Example 7 was employed instead of the polyamide composite of Production Example 2. The evaluation results are shown in Table 5.

EXAMPLE 16

Operations were conducted in a similar manner to Example 10 with the exception that the polyamide composite of Production Example 8 was employed instead of the polyamide composite of Production Example 2. The evaluation results are shown in Table 5.

EXAMPLE 17

Operations were conducted in a similar manner to Example 10 with the exception that the polyamide composite of Production Example 9 was employed instead of the polyamide composite of Production Example 2. The evaluation results are shown in Table 5.

COMPARATIVE EXAMPLE 2

Operations were conducted in a similar manner to Example 10 with the exception that the polyamide of Production Example 10 was employed instead of the polyamide composite of Production Example 2. The evaluation results are shown in Table 5.

COMPARATIVE EXAMPLE 3

Operations were conducted only using the polyamide composite of Production Example 2. The evaluation results are shown in Table 5.

EXAMPLE 18

Operations were conducted in a similar manner to Example 1 with the exception that a mixture of 3.7 g of cuprous iodide (CuI) and 61.6 g of potassium iodide (KI) was employed as a heat-resistance improver instead of 45 g of calcium stearate. Foaming was hardly observed on the strand at the discharge. The evaluation results are shown in Table 6.

EXAMPLE 19

An aqueous solution of a 50% by weight polyamide-forming component (an equimolar salt of hexamethylenediamine and adipic acid) was prepared in an amount of 30 kg. To the aqueous solution were employed 1.3 g of acetic acid as a terminating agent, 6 kg of 25% by weight suspension of calcium monohydrogen phosphate dihydrate (CaHPO$_4$.2H$_2$O) having an average particle size of 3.5 µm (maximum particle size of 20 µm, average particle size of primary particles of 0.15 µm) and a specific surface area of 7.2 m²/g (calcium monohydrogen phosphate dihydrate pure water=1.5 kg:4.5 kg), 1.76 kg of a 25% by weight suspension of heavy calcium carbonate (CaCO₃) having an average particle size of 1.5 µm (calcium carbonate pure water=0.44 kg:1.32 kg), and 0.44 kg of a 25% by weight of calcium fluoride (CaF₂) having an average particle size of 10 tm (calcium fluoride:pure water=0.11 kg:0.33 kg) as an apatite type compound-forming component. The mixture of the aqueous solution of the polyamide-forming component and the suspension of the apatite type compound-forming component was fed into a 70-liter autoclave having a stirring apparatus. The atmosphere in the autoclave was thoroughly replaced by nitrogen under a temperature of 50° C., and then the autoclave was heated from 50° C. to about 150° C. under stirring while removing water into out of the system to prevent the pressure in the autoclaves from exceeding about 0.2 MPa, thereby about 7 kg of water being removed. Thereafter, a mixture of 2.4 g of copper acetate (Cu (CH₃COO)₂) and 64.9 g of potassium iodide (KI) in a weight ratio as a heat-resistance improver was added under pressure form the upper part of the autoclave, followed by continuous heating to about 270° C. At that time, the heating was continued for about 1 hour while removing water into out of the system to prevent the pressure in the autoclaves from exceeding about 1.77 MPa. Thereafter, the pressure was lowered to atmospheric pressure over a period of about 1 hour, and then the stirring was stopped and the polymer was discharged from a lower part nozzle in the form of a strand, which was cooled and cut to obtain a polyamide resin composition. Foaming was hardly observed on the strand at the discharge. The evaluation results are shown in Table 6.

EXAMPLE 20

Operations were conducted in a similar manner to Example 18 with the exception that 3.72 g of cuprous iodide (CuI) and 35.7 g of potassium iodide (KI) was employed. The evaluation results are shown in Table 6.

COMPARATIVE EXAMPLE 4

Operations were conducted in a similar manner to Comparative Example 1 with the exception that a 50% by weight aqueous solution of a mixture of 3.7 g of cuprous iodide (CuI) and 61.6 g of potassium iodide (KI) was added as a heat-resistance improver instead of 45 g of calcium stearate. The strand at the discharge foamed very much and was extremely unstable. The evaluation results are shown in Table 6.

PRODUCTION EXAMPLE 11

A masterbatch of a heat-resistant improver was obtained by incorporating 0.05 part by weight of cuprous iodide (CuI) and 8.5 parts by weight of potassium iodide (KI) to 100 parts by weight of nylon 66 ("1300" manufactured by Asahi Chemical Industry Co., Ltd.), blending them using a cone-type tumbler, and melt-kneading them by means of an extruder ("TEM35" manufactured by Toshiba Machine Co., Ltd.) under a condition of 280° C.

EXAMPLE 21

A polyamide resin composition was obtained by blending 0.05 part by weight of a blend oil (polyethylene glycol: "PEG400" manufactured by Nippon Oil & Fats Co., Ltd.), 0.15 part by weight of calcium montanate as a moldability improver, and 5 parts by weight of the masterbatch of heat-resistance improver of Production Example 11 to 100 parts by weight of the polyamide composite of Production Example 2 using a cone-type tumbler. The evaluation results are shown in Table 7.

COMPARATIVE EXAMPLE 5

Operations were conducted in a similar manner to Example 21 with the exception that the polyamide of Production Example 10 was employed instead of the polyamide composite of Production Example 2. The evaluation results are shown in Table 7.

PRODUCTION EXAMPLE 12

Production of Modified Polyphenylene Ether Resin (1):

One part by weight of di-tert-butyl peroxide and 3 parts by weight of maleic anhydride were dry-blended to 100 parts of poly(2,6-dimethylphenylene-1,4-ether) (hereinafter, referred to as "PPE") having a number-average polymerization degree of 140 at room temperature and then, the blend was extruded at a cylinder temperature of 300° C. and a residence time of 2 minutes using a twin-screw extruder ("PCM45", Ikegai Tekko K. K., screw size of 45 mm, L/D=33, with a bent), cooled with water, and cut to obtain pelletized maleic anhydride-modified poly(2,6-dimethylphenylene-1,4-ether) (hereinafter, referred to as "modified polyphenylene ether resin (1)") From the results of measuring infrared absorption spectrum of the resulting modified polyphenylene ether resin (1), an absorption peak at around 1780 cm⁻¹ derived from a graft reaction with maleic anhydride was confirmed. The ratio of the absorbance at 1780 cm⁻¹ to that at 960 cm⁻¹ (an absorption owing to PPE) was 0.14.

PRODUCTION EXAMPLE 13

Production of Modified Rubber (1):

With 100 parts by weight of an ethylene-(1-butene) copolymer ("TAFMER A-4085" manufactured by Mitsui Chemical Co., Ltd., MFR=3.6 g/10 minutes, density=885 kg/m³) were homogeneously mixed 5.0 parts by weight of maleic anhydride and 1.25 parts by weight of a catalyst for radical polymerization ("Perhexa 25" manufactured by Nippon Oil & Fats Co., Ltd.). Then, the mixture was fed to a twin-screw extruder ("PCM45", Ikegai Tekko K. K., screw size of 45 mm, L/D=33, with a bent) and a graft reaction with maleic acid was conducted at a cylinder of 260° C. while removing unreacted maleic anhydride by sucking from the bent to obtain pellets of modified rubber (1). As a result of titration with sodium methylate, grafted maleic acid was found to be 2.0% by weight.

PRODUCTION EXAMPLE 14

Production of Modified Rubber (2):

With 100 parts by weight of a hydrogenated styrene-butadiene-styrene block copolymer ("Kraton G1652" manufactured by Shell Chemical Company, styrene content of 29%) were homogeneously mixed 4.0 parts by weight of maleic anhydride and 1.0 parts by weight of a catalyst for radical polymerization ("Perhexa 25" manufactured by Nippon Oil & Fats Co., Ltd.). Then, the mixture was fed to a twin-screw extruder ("PCM45", Ikegai Tekko K. K., screw size of 45 mm, L/D=33, with a bent) and a graft reaction with maleic acid was conducted at a cylinder of 260° C. while removing unreacted maleic anhydride by sucking from the bent to obtain pellets of modified rubber (2). As a result of titration with sodium methylate, grafted maleic acid was found to be 2.0% by weight.

PRODUCTION EXAMPLE 15

An aqueous solution of a 50% by weight polyamide-forming component (an equimolar salt of hexamethylenediamine and adipic acid) was prepared in an amount of 30 kg. To the aqueous solution were employed 1.3 g of acetic acid as a terminating agent, 6 kg of 25% by weight suspension of calcium monohydrogen phosphate dihydrate ($CaHPO_4.2H2O$) having an average particle size of 3.5 μm (maximum particle size of 20 μm, average particle size of primary particles of 0.15 μm) and a specific surface area of 7.2 $m^2$/g (calcium monohydrogen phosphate dihydrate:pure water=1.5 kg:4.5 kg), 1.76 kg of a 25% by weight suspension of heavy calcium carbonate ($CaCO_3$) having an average particle size of 1.5 μm (calcium carbonate:pure water=0.44 kg:1.32 kg), and 0.22 kg of a 25% by weight of calcium fluoride ($CaF2$) having an average particle size of 10 μm (calcium fluoride:pure water=0.055 kg:0.165 kg) as an apatite type compound-forming component. Thereafter, operations were conducted in a similar manner to Example 19.

COMPARATIVE EXAMPLE 22

With 100 parts by weight of the polyamide in the polyamide composite of Production Example 2 (100 parts by weight was based on the weight resulted from the subtraction of the content of the apatite type compound from the weight of the polyamide composite) were mixed 80 parts by weight of the modified polyphenylene ether resin (1) and 20 parts by weight of the modified rubber (1). The mixture was melt-kneaded by means of a twin-screw extruder ("TEM35" manufactured by Toshiba Machine Co., Ltd.) under a condition of 280° C. to obtain a resin composition. The evaluation results are shown in Table 8.

COMPARATIVE EXAMPLE 23

With 100 parts by weight of the polyamide in the polyamide composite of Production Example 3 (100 parts by weight was based on the weight resulted from the subtraction of the content of the apatite type compound from the weight of the polyamide composite) were mixed 80 parts by weight of the modified polyphenylene ether resin (1) and 20 parts by weight of the modified rubber (1). The mixture was melt-kneaded by means of a twin-screw extruder ("TEM35" manufactured by Toshiba Machine Co., Ltd.) under a condition of 280° C. to obtain a resin composition. The evaluation results are shown in Table 8.

COMPARATIVE EXAMPLE 24

With 100 parts by weight of the polyamide in the polyamide composite of Production Example 2 (100 parts by weight was based on the weight resulted from the subtraction of the content of the apatite type compound from the weight of the polyamide composite) were mixed 100 parts by weight of the modified polyphenylene ether resin (1) and 20 parts by weight of the modified rubber (1). The mixture was melt-kneaded by means of a twin-screw extruder ("TEM35" manufactured by Toshiba Machine Co., Ltd.) under a condition of 280° C. to obtain a resin composition. The evaluation results are shown in Table 8.

COMPARATIVE EXAMPLE 6

With 100 parts by weight of the polyamide obtained in Production Example 10 were mixed 80 parts by weight of the modified polyphenylene ether resin (1) and 20 parts by weight of the modified rubber (1). The mixture was melt-kneaded by means of a twin-screw extruder ("TEM35" manufactured by Toshiba Machine Co., Ltd.) under a condition of 280° C. to obtain a resin composition. The evaluation results are shown in Table 8.

COMPARATIVE EXAMPLE 25

With 100 parts by weight of the polyamide in the polyamide composite of Production Example 2 (100 parts by weight was based on the weight resulted from the subtraction of the content of the apatite type compound from the weight of the polyamide composite) were mixed 80 parts by weight of the modified polyphenylene ether resin (1), 10 parts by weight of the modified rubber (1), and 10 parts by weight of the modified rubber (2). The mixture was melt-kneaded by means of a twin-screw extruder ("TEM35" manufactured by Toshiba Machine Co., Ltd.) under a condition of 280° C. to obtain a resin composition. The evaluation results are shown in Table 9.

COMPARATIVE EXAMPLE 26

With 100 parts by weight of the polyamide in the polyamide composite of Production Example 15 (100 parts by weight was based on the weight resulted from the subtraction of the content of the apatite type compound from the weight of the polyamide composite) were mixed 80 parts by weight of the modified polyphenylene ether resin (1), 10 parts by weight of the modified rubber (1), and 10 parts by weight of the modified rubber (2). The mixture was melt-kneaded by means of a twin-screw extruder ("TEM35" manufactured by Toshiba Machine Co., Ltd.) under a condition of 280° C. to obtain a resin composition. The evaluation results are shown in Table 9.

COMPARATIVE EXAMPLE 27

With 100 parts by weight of the polyamide in the polyamide composite of Production Example 2 (100 parts by weight was based on the weight resulted from the subtraction of the content of the apatite type compound from the weight of the polyamide composite) were mixed 80 parts by weight of poly(2,6-dimethylphenylene-1,4-ether) 10 parts by weight of an ethylene-propylene copolymer ("TAFMER P-0180" manufactured by Mitsui Chemical Co., Ltd., MFR= 4.5 g/10 minutes, density=870 kg/$m^3$) and 10 parts by weight of a hydrogenated styrene-butadiene-styrene block copolymer ("Kraton G1652" manufactured by Shell Chemical Company, styrene content of 29%) as rubber components, and 1 part by weight of maleic anhydride, and 5 parts by weight of a conductive carbon black ("Ketjenblack EC600DJ" manufactured by Lion Yushi K. K.). The mixture was melt-kneaded by means of a twin-screw extruder ("TEM35" manufactured by Toshiba Machine Co., Ltd.) under a condition of 280° C. to obtain a resin composition. The evaluation results are shown in Table 10.

EXAMPLE 28

With 100 parts by weight of the polyamide in the polyamide composite of Production Example 15 (100 parts by weight was based on the weight resulted from the subtraction of the content of the apatite type compound from the weight of the polyamide composite) were mixed 80 parts by weight of poly(2,6-dimethylphenylene-1,4-ether) having a polymerization degree of 140, 10 parts by weight of an ethylene-(1-butene) copolymer ("TAFMER A-20085" manufactured by Mitsui Chemical Co., Ltd., MFR=18 g/10 minutes, density=885 kg/$m^3$) and 10 parts by weight of a hydrogenated styrene-butadiene-styrene block copolymer ("Kraton G1652" manufactured by Shell Chemical Company, styrene content of 29%) as rubber components, and 1 part by weight of maleic anhydride, and 5 parts by weight of a conductive carbon black ("Ketjenblack EC600DJ" manufactured by Lion Yushi K. K.). The mixture was melt-kneaded by means of a twin-screw extruder ("TEM35" manufactured by Toshiba Machine Co., Ltd.) under a condition of 280° C. to obtain a resin composition. The evaluation results are shown in Table 10.

COMPARATIVE EXAMPLE 7

With 100 parts by weight of the polyamide of Production Example 10 were mixed 13 parts by weight of calcium monohydrogen phosphate dihydrate ($CaHPO_4.2H2O$) having an average particle size of 3.5 μm (maximum particle size of 20 μm, average particle size of primary particles of 0.15 μm, a specific surface area of 7.2 $m^2$/g) and heavy calcium carbonate ($CaCO_3$) having an average particle size of 1.5 μm; 80 parts by weight of poly(2,6-dimethylphenylene-1,4-ether) having a polymerization degree of 140; 10 parts by weight of an ethylene-(1-butene) copolymer ("TAFMER A-20085" manufactured by Mitsui Chemical Co., Ltd., MFR=18 g/10 minutes, density=885 kg/$m^3$) and 10 parts by weight of a hydrogenated styrene-butadiene-styrene block copolymer ("Kraton G1652" manufactured by Shell Chemical Company, styrene content of 29%) as rubber components; 1 part by weight of maleic anhydride; and 5 parts by weight of a conductive carbon black ("Ketjenblack EC600DJ" manufactured by Lion Yushi K. K.). The mixture was melt-kneaded by means of a twin-screw extruder ("TEM35" manufactured by Toshiba Machine Co., Ltd.) under a condition of 280° C. to obtain a resin composition. The evaluation results are shown in Table 11.

COMPARATIVE EXAMPLE 8

With 100 parts by weight of the polyamide of Production Example 10 were mixed 3 parts by weight of calcium monohydrogen phosphate dihydrate ($CaHPO_4.2H_2O$) having an average particle size of 3.5 μm (maximum particle size of 20 μm, average particle size of primary particles of 0.15 μm, a specific surface area of 7.2 $m^2$/g) and heavy calcium carbonate ($CaCO_3$) having an average particle size of 1.5 μm; 80 parts by weight of poly(2,6-dimethylphenylene-1,4-ether) having a polymerization degree of 140; 10 parts by weight of an ethylene-(1-butene) copolymer ("TAFMER A-20085" manufactured by Mitsui Chemical Co., Ltd., MFR=18 g/10 minutes, density=885 kg/$M^3$) and 10 parts by weight of a hydrogenated styrene-butadiene-styrene block copolymer ("Kraton G1652" manufactured by Shell Chemical Company, styrene content of 29%) as rubber components; 1 part by weight of maleic anhydride; and 5 parts by weight of a conductive carbon black ("Ketjenblack EC600DJ" manufactured by Lion Yushi K. K.). The mixture was melt-kneaded by means of a twin-screw extruder ("TEM35" manufactured by Toshiba Machine Co., Ltd.) under a condition of 280° C. to obtain a resin composition. The evaluation results are shown in Table 11.

EXAMPLE 29

With the polyamide composite of Production Example 15 were mixed 25 parts by weight of an amorphous polyamide (1) ("T40" manufactured by Bayer) per 100 parts by weight of the polyamide composite and 33 parts by weight of a glass fiber ("FT756" manufactured by Asahi Fiber Glass Co., Ltd.) per 100 parts by weight of the sum of the polyamide composite of Production Example 15 and the amorphous polyamide (1). The mixture was melt-kneaded by means of a twin-screw extruder ("TEM35" manufactured by Toshiba Machine Co., Ltd.) under a condition of 280° C. to obtain a reinforced polyamide resin composition. The evaluation results are shown in Table 12.

EXAMPLE 30

Operations were conducted in a similar manner to Example 29 with the exception that an amorphous polyamide (2) ("Glybolie XE-3080" manufactured by Emus) was employed instead of the amorphous polyamide (1). The evaluation results are shown in Table 12.

TABLE 1

|  | Unit | Example 1 | Comparative Example 1 |
|---|---|---|---|
| 1. Characteristics of forming component |  |  |  |
| 1) Content of polyamide- forming component | part by weight | 100 | 100 |
| 2) Content of apatite type compound-forming component | part by weight | 13.9 | 13.9 |
| 3) Molar ratio of metal element of apatite-forming component to phosphorus |  | 1.70 | 1.70 |
| 2. Characteristics of polyamide composite |  |  |  |
| 1) Kind of polyamide |  | Ny66 | Ny66 |
| 2) Content of polyamide | part by weight | 100 | 100 |
| 3) Weight-average molecular weight (Mw) |  | 40000 | 30000 |
| 4) Content of apatite type compound | part by weight | 10.4 | 10.4 |
| 5) Molar ratio of metal element to phosphorus |  | 1.70 | 1.70 |
| 6) Particle size of apatite type compound | nm | 85 | 750 (many agglomerated particles) |
| 7) Amount of organic substance contained in apatite type compound (per 100 parts by weight of the compound) | part by weight | 5.5 | 3.5 |
| 3. Moldability improver |  |  |  |
| 1) kind |  | Ca stearate | Ca stearate |
| 2) Amount added (per 100 parts by weight of polyamide- forming component) | part by weight | 0.3 | 0.3 |
| 3) Method for addition |  | added at polymerization (afate formation of apatite type compound) | added at polymerization (afate formation of apatite type compound) |
| 4. Moldability of polyamide resin composition |  |  |  |
| 1) SFD | cm | 12.5 | 14.9 |
| 2) Releasing ability (releasing power) |  |  |  |
| mold at 80° C. | N | 100 | 250 |
| mold at 10° C. | N | 200 | >400 |
| 3) Plasticizing ability | sec | 14 | 15 |

TABLE 1-continued

|  | Unit | Example 1 | Comparative Example 1 |
|---|---|---|---|
| 4) Length of burr | μm | 260 | 500 |
| 5. Physical properties of polyamide resin composition | | | |
| 1) Flexural modulus | MPa | 4.40 | 3.65 |
| 2) Flexural strength | MPa | 147 | 125 |
| 3) Tensile strength | MPa | 98 | 75 |
| 4) Tensile elongation | % | 12.5 | 7 |
| 5) Notched Izod impact strength (23° C.) | J/m | 44 | 30 |
| 6) Deflection temperature under load (load: 1.83 MPa) | ° C. | 130 | 115 |
| 7) Surface appearance |  | 85 | 55 |
| 8) Compressive creep (strain) | mm | 0.7 | 1 |
| 9) Weld strength | MPa | 94 | 70 |
| 10) Hot-water resistance (tensile strength retention after hot water treatment 140° C. × 200 hr) | MPa | 48 | 35 |
| 11) Reworkability (tensile strength after 5 pass by extruder) | MPa | 93 | 70 |

TABLE 2

|  | Unit | Example 2 | Example 3 | Example 4 | Example 5 | Example 6 |
|---|---|---|---|---|---|---|
| 3. Moldability improver | | | | | | |
| 1) Kind |  | Al di-stearate | Al tri-stearate | Ca montanate | Na montanate | Zn stearate |
| 2) Amount added (per 100 parts by weight of polyamide-forming component) | part by weight | 0.3 | 0.3 | 0.3 | 0.3 | 0.3 |
| 3) Method of addition |  | after formation of apatite type compound | after formation of apatite type compound | after formation of apatite type compound | afer formation of apatite type compound | after formation of apatite type compound |
| 4. Moldability of polyamide resin composition | | | | | | |
| 1) SFD | cm | 12.2 | 13.0 | 13.0 | 13.0 | 13.0 |
| 2) Releasing ability (releasing power) | | | | | | |
| mold at 80° C. | N | 100 | 100 | 100 | 100 | 100 |
| mold at 30° C. | N | 200 | 200 | 200 | 180 | 200 |
| 3) Plasticizing ability | sec | 14 | 14 | 14 | 14 | 14 |
| 4) Length of burr | μm | 250 | 200 | 200 | 240 | 200 |

TABLE 3

|  | Unit | Example 7 | Example 8 | Example 9 |
|---|---|---|---|---|
| 3. Moldability Improver | | | | |
| 1) Kind |  | steary stearate<br>Ca stearate<br>erucic amide | a) steary stearate<br>Ca stearate<br>erucic amide<br>b) Ca montanate | a) steary stearate<br>Ca stearate<br>erucic amide<br>b) Ca montanate<br>c) ethylene bisstearylamide |
| 2) Amount added (per 100 parts by weight of polyamide forming component) | part by weight | 0.3 | a) 0.3 | a) 0.3 |
| Amount added (per 100 parts by weight of polyamide component) | part by weight | — | b) 0.15 | b) 0.15<br>c) 0.25 |
| 3) Method of addition |  | added at polymerization (after formation of apatite type compound) | a) added at polymerization (after formation of apatite type compound)<br>b) pellet blend | a) added at polymerization (after formation of apatite type compound)<br>b) pellet blend<br>c) masterbatch blend |
| 4. Moldability of polyamide resin composition | | | | |
| 1) SFD | cm | 12.5 | 12.5 | 12.5 |
| Releasing ability (releasing power) | | | | |
| mold at 80° C. | N | 80 | 30 | 30 |
| mold at 30° C. | N | 120 | 70 | 50 |
| 3) Plasticizing ability | sec | 15 | 12 | 12 |
| 4) Length of burr | μm | 260 | 260 | 260 |

TABLE 4

|  | Unit | Example 10 | Example 11 | Example 12 | Example 13 | Example 14 |
|---|---|---|---|---|---|---|
| 1. Characteristics of forming components | | | | | | |
| 1) Content of polyamide-forming component | part by weight | 100 | 100 | 100 | 100 | 100 |
| 2) Content of apatite type compound-forming component | part by weight | 13.9 | 13.9 | 13.9 | 13.9 | 13.9 |
| 3) Molar ratio of metal element of apatite-forming component to phosphorus | | 1.67 | 1.67 | 1.67 | 1.67 | 1.67 |
| 2. Characteristics of polyamide composite | | | | | | |
| 1) Kind of polyamide | | Ny66 | Ny66/6I | Ny66/6I | Ny6 | Ny66/6I/6 |
| 2) Content of polyamide | part by weight | 100 | 100 | 100 | 100 | 100 |
| 3) Weight-average molecular weight (Mw) | | 40000 | 35000 | 35000 | 42000 | 35000 |
| 4) Content of apatite type compound | part by weight | 10.4 | 10.5 | 10.5 | 10.5 | 10.5 |
| 5) Molar ratio of metal element to phosphorus | | 1.66 | 1.66 | 1.66 | 1.66 | 1.66 |
| 6) Particle size of apatite type compound | nm | 85 | 90 | 90 | 90 | 85 |
| 7) Amount of organic substance contained in apatite type compound (per 100 parts by weight of the compound) | part by weight | 5.5 | 5.5 | 5.5 | 5.5 | 5.5 |
| 3. Moldability improver | | | | | | |
| 1) kind | | Ca montanate | Ca montanate | Ca montanate | Ca montanate | Ca montanate |
| 2) Amount added (per 100 parts by weight of polyamide composite) | part by weight | 0.3 | 0.3 | 0.3 | 0.3 | 0.3 |
| 3) Method of addition | | pellet blend | pellet blend | pellet blend | pellet blend | pellet blend |
| 4. Moldability of polyamide resin composition | | | | | | |
| 1) SFD | cm | 12.2 | 13.0 | 13.0 | 13.0 | 13.2 |
| 2) Releasing ability (releasing power) | | | | | | |
| mold at 80° C. | N | 85 | 90 | 100 | 100 | 100 |
| mold at 30° C. | N | 180 | 200 | 200 | 200 | 200 |
| 3) Plasticizing ability | sec | 14 | 14 | 14 | 14 | 14 |
| 4) Length of burr | μm | 250 | 200 | 200 | 240 | 200 |
| 5. Physical properties of polyamide resin composition | | | | | | |
| 1) Flexural modulus | MPa | 4.40 | 4.20 | 4.20 | 4.00 | 4.40 |
| 2) Flexural strength | MPa | 147 | 140 | 140 | 140 | 140 |
| 3) Tensile strength | MPa | 98 | 96 | 96 | 93 | 98 |
| 4) Tensile elongation | % | 12.5 | 10.5 | 10.5 | 10 | 10.5 |
| 5) Notched Izod impact strength (23° C.) | J/m | 44 | 40 | 40 | 50 | 40 |
| 6) Deflection temperature under load (load: 1.83 MPa) | ° C. | 135 | 125 | 125 | 120 | 125 |
| 7) Surface appearance | | 85 | 85 | 85 | 85 | 85 |
| 8) Compressive creep (strain) | mm | 0.7 | 0.75 | 0.75 | 0.8 | 0.75 |
| 9) Weld strength | MPa | 94 | 90 | 90 | 88 | 90 |
| 10) Hot-water resistance (tensile strength retention after hot water treatment 140° C. × 200 hr) | MPa | 48 | 55 | 55 | 20 | 48 |
| 11) Reworkability (tensile strength after 5 pass by extruder) | MPa | 93 | 89 | 89 | 89 | 93 |

TABLE 5

|  | Unit | Example 15 | Example 16 | Example 17 | Comparative Example 2 | Comparative Example 3 |
|---|---|---|---|---|---|---|
| 1. Characteristics of forming components | | | | | | |
| 1) Content of polyamide-forming component | part by weight | 100 | 100 | 100 | 100 | 100 |
| 2) Content of apatite type compound-component | part by weight | 6.4 | 13.9 | 13.9 | — | 13.9 |
| 3) Molar ratio of metal element of apatite-forming component to phosphorus | | 1.67 | 1.67 | 1.67 | — | 1.67 |
| 2. Characteristics of polyamide composite | | | | | | |
| 1) Kind of polyamide | | Ny66 | Ny66 | Ny66 | Ny66 | Ny66 |
| 2) Content of polyamide | part by weight | 100 | 100 | 100 | 100 | 100 |
| 3) Weight-average molecular weight (Mw) | | 40000 | 37000 | 37000 | 40000 | 40000 |
| 4) Content of apatite type compound | part by weight | 5.4 | 9.5 | 9.4 | — | 10.4 |
| 5) Molar ratio of metal element to phosphorus | | 1.66 | 1.66 | 1.66 | — | 1.66 |
| 6) Particle size of apatite type compound | nm | 65 | 525 | 1200 | — | 85 |

TABLE 5-continued

|  | Unit | Example 15 | Example 16 | Example 17 | Comparative Example 2 | Comparative Example 3 |
|---|---|---|---|---|---|---|
| 7) Amount of organic substance contained in apatite type compound (per 100 parts by weight of the compound) | part by weight | 7.5 | 0.5 | 0.5 | — | 5.5 |
| 3. Moldability improver | | | | | | |
| 1) kind | | Ca montanate | Ca montanate | Ca montanate | Ca montanate | — |
| 2) Amount added (per 100 parts by weight of polyamide composite) | part by weight | 0.3 | 0.3 | 0.3 | 0.3 | — |
| 3) Method of addition | | pellet blend | pellet blend | pellet blend | pellet blend | — |
| 4. Moldability of polyamide resin composition | | | | | | |
| 1) SFD | cm | 12.2 | 13.0 | 13.0 | 13.3 | 13.2 |
| 2) Releasing ability (releasing power) | | | | | | |
| mold at 80° C. | N | 90 | 110 | 110 | 150 | >400 |
| mold at 30° C. | N | 180 | 220 | 220 | 250 | >400 |
| 3) Plasticizing ability | sec | 14 | 14 | 14 | 16 | 19 |
| 4) Length of burr | μm | 200 | 300 | 300 | 600 | 350 |
| 5. Physical properties of polyamide resin composition | | | | | | |
| 1) Flexural modulus | MPa | 3.55 | 3.6 | 3.6 | 2.75 | 4.40 |
| 2) Flexural strength | MPa | 135 | 135 | 135 | 118 | 147 |
| 3) Tensile strength | MPa | 92 | 88 | 88 | 80 | 98 |
| 4) Tensile elongation | % | 20.0 | 9.0 | 8.5 | 25.0 | 12.5 |
| 5) Notched Izod impact strength (23° C.) | J/m | 55 | 30 | 30 | 54 | 44 |
| 6) Deflection temperature under load (load: 1.83 MPa) | ° C. | 115 | 110 | 110 | 75 | 135 |
| 7) Surface appearance | | 90 | 75 | 75 | 85 | 85 |
| 8) Compressive creep (strain) | mm | 0.9 | 1 | 1 | 1.25 | 0.75 |
| 9) Weld strength | MPa | 90 | 90 | 90 | 78 | 94 |
| 10) Hot-water resistance (tensile strength retention after hot water treatment 140° C. × 200 hr) | MPa | 40 | 35 | 35 | 23 | 48 |
| 11) Reworkability (tensile strength after 5 pass by extruder) | MPa | 88 | 85 | 85 | 78 | 93 |

TABLE 6

|  | Unit | Example 18 | Example 19 | Example 20 | Comparative Example 4 |
|---|---|---|---|---|---|
| 1. Characteristics of forming components | | | | | |
| 1) Content of polyamide-forming component | part by weight | 100 | 100 | 100 | 100 |
| 2) Content of apatite type compound-forming component | part by weight | 13.9 | 13.9 | 13.9 | 13.9 |
| 3) Molar ratio of metal element of apatite-forming component to phosphorus | | 1.67 | 1.67 | 1.67 | 1.67 |
| 2. Characteristics of polyamide composite | | | | | |
| 1) Kind of polyamide | | Ny66 | Ny66 | Ny66 | Ny66 |
| 2) Content of polyamide | part by weight | 100 | 100 | 100 | 100 |
| 3) Weight-average molecular weight (Mw) | | 40000 | 40000 | 40000 | 36000 |
| 4) Content of apatite type compound | part by weight | 10.4 | 10.4 | 10.4 | 10.4 |
| 5) Molar ratio of metal element to phosphorus | | 1.79 | 1.70 | 1.70 | 1.70 |
| 6) Particle size of apatite type compound | nm | 85 | 85 | 85 | 1200 (many agglomerated particles) |
| 7) Amount of organic substance contained in apatite type compound (per 100 parts by weight of the compound) | part by weight | 5.5 | 5.5 | 5.5 | 3.0 |
| 3. Heat-resistance improver | | | | | |
| 1-1) Metal halide | | KI | KI | KI | KI |
| 1-2) Amount of metal halide added (per 100 parts by weight of polyamide-forming component) | part by weight | 0.41 | 0.43 | 0.24 | 0.41 |
| 2-1) Copper compound | | CuI | copper acetate | CuI | CuI |
| 2-2) Amount of Cu compound added (per 100 parts by weight of polyamide-forming component) | part by weight | 0.025 | 0.016 | 0.025 | 0.025 |

TABLE 6-continued

|  |  | Unit | Example 18 | Example 19 | Example 20 | Comparative Example 4 |
|---|---|---|---|---|---|---|
| 3) | Molar ratio of halogen/copper | (l/Cu) | 20/1 | 20/1 | 12/1 | 20/1 |
| 4) | State of heat-resistant improver at addition |  | aqueous solution | aqueous solution | aqueous solution | aqueous solution |
| 5) | Method of addition (added at polymerization) |  | after formation of apatite type compound | after formation of apatite type compound | after formation of apatite type compound | before formation of apatite type compound |
| 5. Physical properties of polyamide resin composition |  |  |  |  |  |  |
| 1) | Flexural modulus | MPa | 4.40 | 4.40 | 4.40 | 3.50 |
| 2) | Flexural strength | MPa | 147 | 147 | 147 | 125 |
| 3) | Tensile strength | MPa | 102 | 102 | 102 | 70 |
| 4) | Tensile elongation | % | 15.0 | 14.5 | 14.5 | 5.5 |
| 5) | Notched Izod impact strength (23° C.) | J/m | 50 | 50 | 50 | 30 |
| 6) | Deflection temperature under load (load: 1.83 MPa) | ° C. | 135 | 135 | 135 | 115 |
| 7) | Heat-resistant aging property (180° C: half value period of tensile strength) | Hr | 750 | 750 | 700 | 300 |

TABLE 7

|  |  | Unit | Example 21 | Comparative Example 5 |
|---|---|---|---|---|
| 1. Characteristics of forming components |  |  |  |  |
| 1) | Content of polyamide-forming component | part by weight | 100 | 100 |
| 2) | Content of apatite type compound-forming component | part by weight | 13.9 |  |
| 3) | Molar ratio of metal element of apatite-forming component to phosphorus |  | 1.67 | — |
| 2. Characteristics of polyamide composite |  |  |  |  |
| 1) | Kind of polyamide |  | Ny66 | Ny66 |
| 2) | Content of polyamide | part by weight | 100 | 100 |
| 3) | Weight average molecular weight (Mw) |  | 40000 | 40000 |
| 4) | Content of apatite type compound | part by weight | 10.4 | — |
| 5) | Molar ratio of metal element to phosphorus |  | 1.66 | — |
| 6) | Particle size of apatite type compound | nm | 85 | — |
| 7) | Amount of organic substance contained in apatite type compound (per 100 parts by weight of the compound) | part by weight | 5.5 | — |
| 3. Moldability improver |  |  |  |  |
| 1) | kind |  | Ca montanate | Ca montanate |
| 2) | Amount added (per 100 parts by weight of polyamide composite) | part by weight | 0.15 | 0.15 |
| 3) | Method of addition |  | pellet blend | pellet blend |
| 4. Heat resistance improver |  |  |  |  |
| 1-1) | Metal halide |  | KI | KI |
| 1-2) | Amount of metal halide added (per 100 parts by weight of polyamide composite) | part by weight | 0.43 | 0.43 |
| 2-1) | Copper compound |  | CuI | CuI |
| 2-2) | Amount of Cu compound added (per 100 parts by weight of polyamide composite) | part by weight | 0.025 | 0.025 |
| 3) | Molar ratio of halogen/copper | (l/Cu) | 20/1 | 20/1 |
| 4) | State of heat-resistance improver at addition |  | master batch | master batch |
| 5) | Method of additon |  | pellet blend | pellet blend |
| 5. Physical properties of polyamide resin composition |  |  |  |  |
| 1) | Flexural modulus | MPa | 4.40 | 2.75 |
| 2) | Flexural strength | MPa | 141 | 118 |
| 3) | Tensile strength | MPa | 102 | 85 |
| 4) | Tensile elongation | % | 15 | 27 |
| 5) | Notched Izod impact strength (23° C.) | J/m | 50 | 56 |
| 6) | Deflection temperature under load (load: 1.83 MPa) | ° C. | 135 | 75 |
| 7) | Heat-resisitant aging property (180° C.: half value period of tensile strength) | Hr | 750 | 515 |

TABLE 8

| | Unit | Comparative Example 22 | Comparative Example 23 | Comparative Example 24 | Com. Ex. 6 |
|---|---|---|---|---|---|
| 1. Characteristics of forming components | | | | | |
| 1) Content of polyamide-forming component | part by weight | 100 | 100 | 100 | 100 |
| 2) Content of apatite-forming component | part by weight | 13.9 | 13.9 | 13.9 | — |
| 3) Molar ratio of metal element of apatite-forming component to phosphorus | | 1.67 | 1.67 | 1.67 | — |
| 2. Characteristics of polyamide composite | | | | | |
| 1) Kind of polyamide | | Ny66 | Ny66/6I | Ny66 | Ny66 |
| 2) Content of polyamide | part by weight | 100 | 100 | 100 | 100 |
| 3) Weight-average molecular weight (Mw) | | 40000 | 35000 | 40000 | 40000 |
| 4) Content of apatite type compound | part by weight | 10.4 | 10.4 | 10.4 | — |
| 5) Molar ratio of metal element to phosphorus | | 1.66 | 1.66 | 1.66 | — |
| 6) Particle size of apatite type compound | nm | 85 | 90 | 85 | — |
| 7) Amount of organic substance contained in apatite type compound (per 100 parts by weight of the compound) | part by weight | 5.5 | 5.5 | 5.5 | — |
| 3. Polyphenylene ether resin | | | | | |
| 1) Kind | | Modified polyphenylene ether resin (1)** | Modified polyphenylene ether resin (1)** | Modified polyphenylene ether resin (1)** | Modified polyphenylene ether resin (1)** |
| 2) Amount added | part by weight | 80 | 80 | 100 | 80 |
| 4. Rubber | | | | | |
| 1) Kind | | Maleic acid-modified ethylene-(1-butene) copolymer | Maleic acid-modified ethylene-(1-butene) copolymer | Maleic acid-modified ethylene-(1-butene) copolymer | Maleic acid-modified ethylene-(1-butene) copolymer |
| 2) Amount added | part by weight | 20 | 20 | 20 | 20 |
| 5. Physical properties of polyamide resin composition | | | | | |
| 1) Flexural modulus | GPa | 2.55 | 2.55 | 2.40 | 2.10 |
| 2) Flexural strength | Mpa | 95 | 95 | 93 | 85 |
| 3) Tensile strength | Mpa | 62 | 62 | 60 | 58 |
| 4) Tensite elongation | % | 80 | 70 | 75 | 90 |
| 5) Notched Izod impact strength (23° C.) | J/m | 225 | 225 | 500 | 250 |
| (−30° C.) | J/m | 150 | 150 | 200 | 160 |
| 6) Deflection temperature under load (load: 1.83 MPa) | ° C. | 150 | 135 | 150 | 130 |
| 7) Water absorption (23° C. × 24 hr) | % by weight | 0.60 | 0.57 | 0.55 | 0.75 |
| 8) Molding shrinkage | % | 1.20 | 1.20 | 1.23 | 1.35 |
| 9) Warpage | mm | 0.90 | 0.90 | 0.95 | 1.50 |

**Modified polyphenylene ether resin (1): Maleic anhydride-modified poly(2,6-dimethylphenylene-1,4-ether)

TABLE 9

| | Unit | Comparative Example 25 | Comparative Example 26 |
|---|---|---|---|
| 1. Characteristics of forming components | | | |
| 1) Content of polyamide-forming component | part by weight | 100 | 100 |
| 2) Content of apatite type compound-forming component | part by weight | 13.9 | 12.0 |
| 3) Molar ratio of metal element of apatite-forming component to phosphorus | | 1.67 | 1.67 |
| 2. Characteristics of polyamide composite | | | |
| 1) Kind of polyamide | | Ny66 | Ny66 |
| 2) Content of polyamide | part by weight | 100 | 100 |
| 3) Weight-average molecular weight (Mw) | | 40000 | 40000 |
| 4) Content of apatite type compound | part by weight | 10.4 | 10.4 |
| 5) Molar ratio of metal element to phosphorus | | 1.66 | 1.70 |
| 6) Particle size of apatite type compound | nm | 85 | 65 |

TABLE 9-continued

| | Unit | Comparative Example 25 | Comparative Example 26 |
|---|---|---|---|
| 7) Amount of organic substance contained in apatite type compound (per 100 parts by weight of the compound) | part by weight | 5.5 | 7.5 |
| 3. Polyphenylene ether resin | | | |
| 1) Kind | | Modified polyphenylene ether resin (1)** | Modified polyphenylene ether resin (1)** |
| 2) Amount added | part by weight | 80 | 80 |
| 4. Rubber | | | |
| 1) Kind | | a) Maleic acid-modified ethylene-(1-butene)-copolymer b) maleic acid-modified hydrogenated styrene-butadiene-styrene block copolymer | a) Maleic acid-modified ethylene-(1-butene)-copolymer b) maleic acid-modified hydrogenated styrene-butadiene-styrene block copolymer |
| 2) Amount added | part by weight | a) 10 b) 10 | a) 10 b) 10 |
| 5. Physical properties of polyamide resin composition | | | |
| 1) Flexural modulus | GPa | 2.55 | 2.45 |
| 2) Flexural strength | Mpa | 95 | 93 |
| 3) Tensile strength | Mpa | 62 | 62 |
| 4) Tensile elongation | % | 80 | 80 |
| 5) Notched Izod impact strength | J/m | 225 | 250 |
| (23° C.) | J/m | 150 | 175 |
| 6) Deflection temperature under load (load: 1.83 MPa) | ° C. | 150 | 150 |
| 7) Water absorpton 23° C. × 24 hr) | Weight % | 0.60 | 0.55 |
| 8) Molding shrinkage | % | 1.20 | 1.10 |
| 9) Warpage | mm | 0.90 | 0.80 |

**Modified polyphenylene ether resin (1): Maleic anhydride-modified poly(2,6-dimethylphenylene-1,4-ether)

TABLE 10

| | Unit | Comparative Example 27 | Example 28 |
|---|---|---|---|
| 1. Characteristics of forming components | | | |
| 1) Content of polyamide- forming component | Part by weight | 100 | 100 |
| 2) Content of apatite type compound-forming component | Part by weight | 13.9 | 12.0 |
| 3) Molar ratio of metal element of apatite-forming component to phosphorus | | 1.67 | 1.67 |
| 2. Characteristics of polyamide composite | | | |
| 1) Kind of polyamide | | Ny66 | Ny66 |
| 2) Content of polyamide | Part by weight | 100 | 100 |
| 3) Weight-average molecular weight (Mw) | | 40000 | 40000 |
| 4) Content of apatite type compound | Part by weight | 10.4 | 10.4 |
| 5) Molar ratio of metal element to phosphorus | | 1.66 | 1.70 |
| 6) Particle size of apatite type compound | nm | 85 | 65 |
| 7) Amount of organic substance contained in apatite type compound (per 100 parts by weight of the compound) | Part by weight | 5.5 | 7.5 |
| 3. Polyphenylene ether resin | | | |
| 1) Kind | | PPE*** | PPE*** |
| 2) Amount added | Part by weight | 80 | 80 |
| 4. Rubber | | | |
| 1) Kind | | a) hydrogenated styrene- butadiene-styrene block copolymer b) ethylene-propylene copolymer | a) hydrogenated styrene- butadiene-styrene block copolymer b) ethylene-(1-butene) copolymer |
| 2) Amount added | part by weight | a) 10 b) 10 | a) 10 b) 10 |
| 5. Modifier | | | |
| 1) Kind | | maleic anhydride | maleic anhydride |

TABLE 10-continued

|  | Unit | Comparative Example 27 | Example 28 |
|---|---|---|---|
| 2) Amount added | part by weight | 1 | 1 |
| 6. Conductive carbon black |  |  |  |
| 1) Kind |  | Ketjenblack | Ketjenblack |
| 2) Amount added | part by weight | 5 | 5 |
| 7. Physical properties of polyamide resin composition |  |  |  |
| 1) Flexural modulus GPa | GPa | 2.65 | 2.55 |
| 2) Flexural strength | MPa | 98 | 95 |
| 3) Tensile strength MPa | MPa | 62 | 61 |
| 4) Tensile elongation | % | 30 | 35 |
| 5) Notched Izod impact strength |  |  |  |
| (23° C.) | J/m | 120 | 180 |
| (−30° C.) | J/m | 80 | 90 |
| 6) Deflection temperature under load (load: 1.83 MPa) | ° C. | 155 | 155 |
| 7) Water absorption (23° C. × 24 hr) | Weight % | 0.57 | 0.50 |
| 8) Molding shrinkage | % | 1.15 | 1.00 |
| 9) Warpage | mm | 0.90 | 0.75 |

***PPE: poly(2,6-dimethylphenylene-1,4-ether)

TABLE 11

|  | Unit | Comparative Example 7 | Comparative Example 8 |
|---|---|---|---|
| 1. Characteristics of forming components |  |  |  |
| 1) Content of polyamide-forming component | part by weight | 100 | 100 |
| 2) Content of apatite type compound-forming component | part by weight | — | 13.0 |
| 3) Molar ratio of metal element of apatite-forming component to phosphorus |  | 1.65 | — |
| 2. Characteristics of polyamide composite |  |  |  |
| 1) Kind of polyamide |  | Ny66 | Ny66 |
| 2) Content of polyamide | part by weight | 100 | 100 |
| 3) Weight-average molecular weight (Mw) |  | 40000 | 40000 |
| 4) Content of apatite type compound | part by weight | — | 12.0 |
| 5) Molar ratio of metal element to phosphorus |  | — | 1.65 |
| 6) Particle size of apatite type compound | nm | — | 3000 |
| 7) Amount of organic substance contained in apatite type compound (per 100 parts by weight of the compound) | part by weight | — | 0.15 |
| 3. Polyphenylene ether resin |  |  |  |
| 1) Kind |  | PPE*** | PPE*** |
| 2) Amount added | part by weight | 80 | 80 |
| 4. Rubber |  |  |  |
| 1) Kind |  | a) hydrogenated styrene-butadiene-styrene block copolymer b) ethylene-(1-butene) copolymer | a) hydrogenated styrene-butadiene-styrene block copolymer b) ethylene-(1-butene) copolymer |
| 2) Amount added | part by weight | a) 10 b) 10 | a) 10 b) 10 |
| 5. Modifier |  |  |  |
| 1) Kind |  | maleic anhydride | maleic anhydride |
| 2) Amount added | part by weight | 1 | 1 |
| 6. Conductive carbon black |  |  |  |
| 1) Kind |  | Ketjenblack | Ketjenblack |
| 2) Amount added | part by weight | 5 | 5 |
| 7. Physical properties of polyamide resin composition |  |  |  |
| 1) Flexural modulus GPa | GPa | 2.40 | 2.40 |
| 2) Flexural strength | Mpa | 93 | 93 |
| 3) Tensile strength MPa | Mpa | 60 | 50 |
| 4) Tensile elongation | % | 30 | 7 |
| 5) Notched Izod impact strength (23° C.) | J/m | 120 | 50 |
| (−30° C.) | J/m | 80 | 30 |
| 6) Deflection temperature under load (load: 1.83 MPa) | ° C. | 145 | 140 |
| 7) Water absorption (23° C. × 24 hr) | Weight % | 0.65 | 0.65 |
| 8) Molding shrinkage | % | 1.30 | 1.20 |
| 9) Warpage | mm | 1.45 | 1.30 |

***PPE: poly(2,6-dimethylphenylene-1,4-ether)

TABLE 12

| | Unit | Comparative Example 29 | Comparative Example 30 |
|---|---|---|---|
| 1. Characteristics of forming components | | | |
| 1-1) Content of polyamide-forming component | part by weight | 100 | 100 |
| 1-2) Content of apatite type compound-forming component | part by weight | 12.0 | 12.0 |
| 1-3) Molar ratio of metal element of apatite-forming component to phosphorus | | 1.67 | 1.67 |
| 2. Characteristics of polyamide resin composition | | | |
| 2a) Characterstics of polyamide composite | | Ny66 | Ny66 |
| 2a-1) Kind of polyamide | | | |
| 2a-2) Content of polyamide | part by weight | 100 | 100 |
| 2a-3) Content of apatite type compound (per 100 parts by weight of polyamide) | | 10.4 | 10.4 |
| 2a-4) Weight-average molecular weight (Mw) | part by weight | 40000 | 40000 |
| 2a-5) Molar ratio of metal element to phosphorus | | 1.66 | 1.66 |
| 2a-6) Particle size of apatite type compound | Nm | 65 | 65 |
| 2a-7) Amount of organic substance contained in apatite type compound (per 100 parts by weight of the compound) | part by weight | 7.5 | 7.5 |
| 2b) Characteristics of amorphous polyamide | | Amorphous | Amorphous |
| 2b-1) Kind | | PA(1) | PA(2) |
| 2c-2) Melting calorie | J/g | <1 | <1 |
| 2b-3) Amount added | part by weight | 25 | 25 |
| 3. Characteristics of inorganic filler | | | |
| 3-1) Kind | °C. | GF | GF |
| 3-2) Amount added (per 100 parts by weight of polyamide resin composition) | part by weight | 33 | 33 |
| 4. Physical properties of polyamide resin composition | | | |
| 4-1) Melting point | °C. | 255 | 255 |
| 4-2) Melting calorie | J/g | 30 | 30 |
| 4-3) Flexural strength | GPa | 8.2 | 8.2 |
| 4-4) Tensile strength | Mpa | 170 | 170 |
| 4-5) Notched Izod impact strength (23° C.) | J/m | 115 | 115 |
| 4-6) Deflection temperature under load (load: 1.83 MPa) | °C. | 245 | 245 |
| 4-7) Coating adhesiveness: initial adhesiveness | | 100/100 | 100/100 |
| secondary adhesiveness | | 100/100 | 100/100 |
| appearance | Visually | good | good | amorphous PA(1): "T40" manufactured by Bayer
amorphous PA(2): "Glybolie XE-3080" manufactured by Emus

Industry Applicability

The present invention relates to a polyamide resin composition comprising a polyamide composite containing an apatite type compound dispersed homogeneously and finely in a matrix of a polyamide and well fixed and adhered to the polyamide at the interface, and any of a moldability improver, a heat-resistance improver, a deterioration inhibitor, and a resin other than a polyamide. Accordingly, the resulting molded product has a characteristic that it is excellent in various kinds of moldability, mechanical properties such as rigidity and strength, and durability such as heat-resistant aging property, so that it is expected to be extremely useful for various uses such as automobile exterior/outer panel parts, automobile interior parts, automobile underhood parts, parts for two-wheeled vehicles, parts for furniture, goods for office automation equipments, electronic/electrical parts, and industrial parts.

What is claimed is:

1. A polyamide resin composition comprising (A) a polyamide, (B) an apatite compound, and (C) (i) a higher fatty acid metal salt and/or (ii) a mixture of a metal halide and a copper compound, wherein the polyamide resin composition is obtained by adding component (C) after the formation of the apatite compound.

2. The polyamide resin composition according to claim 1, wherein the amount of (B) is from 0.05 to 200 parts by weight and the amount of (C) is from 0.01 to 20 parts by weight relative to 100 parts by weight of (A).

3. The polyamide resin composition according to claim 2, which is obtained by adding 0.01 to 20 parts by weight of component (C) in a step after the completion of formation of the apatite compound in the steps of producing a polyamide composite comprising the polyamide (A) and the apatite compound (B) by incorporating 0.05 to 200 parts by weight of an apatite compound-forming component into 100 parts by weight of a polyamide-forming component and promoting the polymerization of the polyamide and the synthesis of the apatite compound.

4. The polyamide resin composition according to any one of claims 1 to 3, wherein the higher fatty acid metal salt of (C) (i) is represented by the general formula (1): $CH_3(CH_2)_m COO\ (M_1)$ wherein n is from 8 to 30 and a metal element $(M_1)$ is at least one metal element selected form the elements of Groups 1, 2, and 3 of the periodic table, zinc, and aluminums.

5. The polyamide resin composition according to any one of claims 1 to 3, wherein the metal halide of the mixture (C) (ii) is potassium iodide, the copper compound is copper acetate or copper iodide, and the molar ratio of the halogen to copper is from 2/1 to 40/1.

6. The polyamide resin composition according to any one of claims 1 to 3, wherein 1 to 300 parts by weight of a polyphenylene ether resin is incorporated into 100 parts by weight of (A), and wherein components (B) and (C) are mainly present in component (A).

7. The polyamide resin composition according to claim 3, wherein the apatite compound-forming component is a phosphoric acid metal compound having a maximum particle size of 30 µm or less.

8. The polyamide resin composition according to claim 3, wherein the apatite compound-forming component is a phosphoric acid metal compound having a specific surface area of 0.1 to 100 m$^2$/g.

9. The polyamide resin composition according to any one of claims 1 to 3, wherein an apatite compound having an average particle size of 0.01 to 1 µm is homogeneously dispersed in a polyamide having a weight-average molecular weight of 20,000 to 200,000.

10. A process for producing a polyamide resin composition comprising, relative to (A) 100 parts by weight of a polyamide, (B) 0.05 to 200 parts by weight of an apatite compound, and (C) 0.01 to 20 parts by weight of (i) a higher fatty acid metal salt and/or (ii) a mixture of a metal halide and a copper compound, wherein component (C) is added after the formation of the apatite compound.

* * * * *